US009863341B2

(12) United States Patent
Kurotani et al.

(10) Patent No.: US 9,863,341 B2
(45) Date of Patent: Jan. 9, 2018

(54) CONTROL DEVICE FOR INTERNAL COMBUSTION ENGINE

(71) Applicant: HONDA MOTOR CO., LTD., Tokyo (JP)

(72) Inventors: Tadashi Kurotani, Wako (JP); Shohei Yamashita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/089,592

(22) Filed: Apr. 4, 2016

(65) Prior Publication Data

US 2016/0326973 A1    Nov. 10, 2016

(30) Foreign Application Priority Data

May 8, 2015    (JP) ................................. 2015-095859

(51) Int. Cl.
*F02D 41/00*    (2006.01)
*F02P 5/145*    (2006.01)
(Continued)

(52) U.S. Cl.
CPC ..... *F02D 41/0025* (2013.01); *F02D 19/0692* (2013.01); *F02D 19/081* (2013.01);
(Continued)

(58) Field of Classification Search
CPC .. F02D 19/0692; F02D 19/081; F02D 35/027; F02D 37/02; F02D 41/0025;
(Continued)

(56) References Cited

U.S. PATENT DOCUMENTS 5,909,723 A * 6/1999 Ichimoto ............... F02P 5/1504
                                                123/406.19
2005/0109317 A1* 5/2005 Niimi ..................... F02D 19/081
                                                123/406.45
(Continued)

FOREIGN PATENT DOCUMENTS

JP    2009-293600        12/2009
JP    2014066157 A   *   4/2014

OTHER PUBLICATIONS

Jp 2014-066157 English Translation Version.*

*Primary Examiner* — John Kwon
*Assistant Examiner* — Johnny H Hoang
(74) *Attorney, Agent, or Firm* — Mori & Ward, LLP

(57) ABSTRACT

A knocking detector is to detect knocking in the internal combustion engine in which a low-octane fuel is injected into a cylinder and a high-octane fuel whose octane number higher than an octane number of the low-octane fuel is injected into an inlet port. A knocking suppressor includes a first knocking suppressor and a second knocking suppressor. The first knocking suppressor is to increase a high-octane fuel ratio of an injection quantity of the high-octane fuel to a sum of an injection quantity of the low-octane fuel and the injection quantity of the high-octane fuel in order to suppress knocking in the internal combustion engine when the knocking detector detects the knocking. The second knocking suppressor is to suppress knocking of the internal combustion engine at a beginning of a period while the first knocking suppressor increases the high-octane fuel ratio.

6 Claims, 13 Drawing Sheets

(51) Int. Cl.
  *F02D 41/40* (2006.01)
  *F02D 19/08* (2006.01)
  *F02P 5/152* (2006.01)
  *F02D 19/06* (2006.01)
  *F02D 35/02* (2006.01)
  *F02D 37/02* (2006.01)

(52) U.S. Cl.
  CPC .......... *F02D 35/027* (2013.01); *F02D 37/02* (2013.01); *F02P 5/1523* (2013.01); *F02P 5/1527* (2013.01); *F02D 2200/0611* (2013.01); *F02P 5/145* (2013.01); *Y02T 10/36* (2013.01); *Y02T 10/46* (2013.01)

(58) Field of Classification Search
  CPC . F02D 2200/0611; F02P 5/145; F02P 5/1523; F02P 5/1527; Y02T 10/30; Y02T 10/44; Y02T 10/46
  USPC ....... 123/1 A, 27 GE, 525–527, 575, 406.34, 123/406.37–406.39, 406.3, 299, 300, 302, 123/304; 701/111, 114
  See application file for complete search history.

(56) References Cited

U.S. PATENT DOCUMENTS

| | | | |
|---|---|---|---|
| 2007/0215102 A1* | 9/2007 | Russell | F02D 41/0025 123/310 |
| 2008/0127933 A1* | 6/2008 | Blumberg | F02B 11/00 123/304 |
| 2011/0174268 A1* | 7/2011 | Surnilla | F02D 35/027 123/406.29 |
| 2012/0024262 A1* | 2/2012 | Leone | F02D 35/027 123/406.47 |
| 2015/0101566 A1* | 4/2015 | Leone | F02D 41/0027 123/304 |
| 2015/0300280 A1* | 10/2015 | Zhou | F02D 41/3035 123/435 |

* cited by examiner

CONTROL DEVICE FOR INTERNAL COMBUSTION ENGINE

CROSS-REFERENCE TO RELATED APPLICATIONS

The present application claims priority under 35 U.S.C. §119 to Japanese Patent Application No. 2015-095859, filed May 8, 2015, entitled "Control Device of Internal Combustion Engine." The contents of this application are incorporated herein by reference in their entirety.

BACKGROUND

Field of the Invention

The present disclosure relates to a control device for an internal combustion engine.

Discussion of the Background

In the past, as a control device of this type of internal combustion engine, a control device disclosed in Japanese Unexamined Patent Application Publication No. 2009-293600, for example, has been known. In this internal combustion engine, a low-octane fuel and a high-octane fuel whose octane number is higher than the octane number of the low-octane fuel are used in combination as fuel, and the low-octane fuel is injected into a cylinder from a first fuel injection valve and the high-octane fuel is injected into an inlet port from a second fuel injection valve. Moreover, the low-octane fuel and the high-octane fuel are generated by separating the fuel stored in a fuel tank by a separator. Furthermore, in this existing control device, in order to suppress knocking of the internal combustion engine, a required octane number of the internal combustion engine is set and, based on the set required octane number, the injection quantities of fuel to be injected by the first and second fuel injection valves are controlled.

In addition, when knocking of the internal combustion engine is detected, high-octane fuel increase control by which the ratio of the supply of the high-octane fuel to the quantity of fuel which is supplied to the inside of the cylinder is increased is first performed. In the high-octane fuel increase control, the ratio of the supply of the high-octane fuel (hereinafter referred to as the "high-octane fuel ratio") is increased to a maximum value commensurate with the detected knock intensity. Moreover, if knocking of the internal combustion engine is still occurring even when this high-octane fuel increase control is performed, ignition retardation control by which a correction to retard ignition timing of a spark plug of the internal combustion engine is made is performed. As described above, in this existing control device, by preferentially performing the high-octane fuel increase control before the ignition retardation control when knocking of the internal combustion engine is detected, a reduction in fuel economy of the internal combustion engine is suppressed with knocking of the internal combustion engine being suppressed.

SUMMARY

According to one aspect of the present invention, a control device for an internal combustion engine includes a knocking detector and a knocking suppressor. The knocking detector is to detect knocking in the internal combustion engine in which a low-octane fuel is injected into a cylinder and a high-octane fuel whose octane number higher than an octane number of the low-octane fuel is injected into an inlet port. The knocking suppressor includes a first knocking suppressor and a second knocking suppressor. The first knocking suppressor is to increase a high-octane fuel ratio of an injection quantity of the high-octane fuel to a sum of an injection quantity of the low-octane fuel and the injection quantity of the high-octane fuel in order to suppress knocking in the internal combustion engine when the knocking detector detects the knocking. The second knocking suppressor is to suppress knocking of the internal combustion engine at a beginning of a period while the first knocking suppressor increases the high-octane fuel ratio.

According to another aspect of the present invention, a control device for an internal combustion engine includes a knocking detector and a knocking suppressor. The knocking detector is to detect knocking in the internal combustion engine in which a low-octane fuel and a high-octane fuel whose octane number is higher than an octane number of the low-octane fuel are supplied into a cylinder via a first fuel injection valve and a second fuel injection valve, respectively, and an air fuel mixture in the cylinder is ignited by a spark plug. The knocking suppressor includes a first knocking suppressor and a second knocking suppressor. The first knocking suppressor is to increase a high-octane fuel ratio of an injection quantity of the high-octane fuel to a sum of an injection quantity of the low-octane fuel and the injection quantity of the high-octane fuel in order to suppress knocking in the internal combustion engine when the knocking detector detects the knocking. The second knocking suppressor is to retard ignition timing of the spark plug.

According to further aspect of the present invention, a control device for an internal combustion engine includes a knocking detector and a knocking suppressor. The knocking detector is to detect knocking in the internal combustion engine in which a low-octane fuel is injected into a cylinder and a high-octane fuel whose octane number is higher than an octane number of the low-octane fuel is injected into an inlet port. The knocking suppressor is to increase, to an increased value, a high-octane fuel ratio of an injection quantity of the high-octane fuel to a sum of an injection quantity of the low-octane fuel and the injection quantity of the high-octane fuel in order to suppress knocking in the internal combustion engine when the knocking detector detects the knocking and to maintain a high-octane fuel ratio of the increased value until a period based on at least the high octane fuel ratio elapses after the knocking suppressor increases the high octane fuel ratio independently of whether the knocking detector detects the knocking or not during the period.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
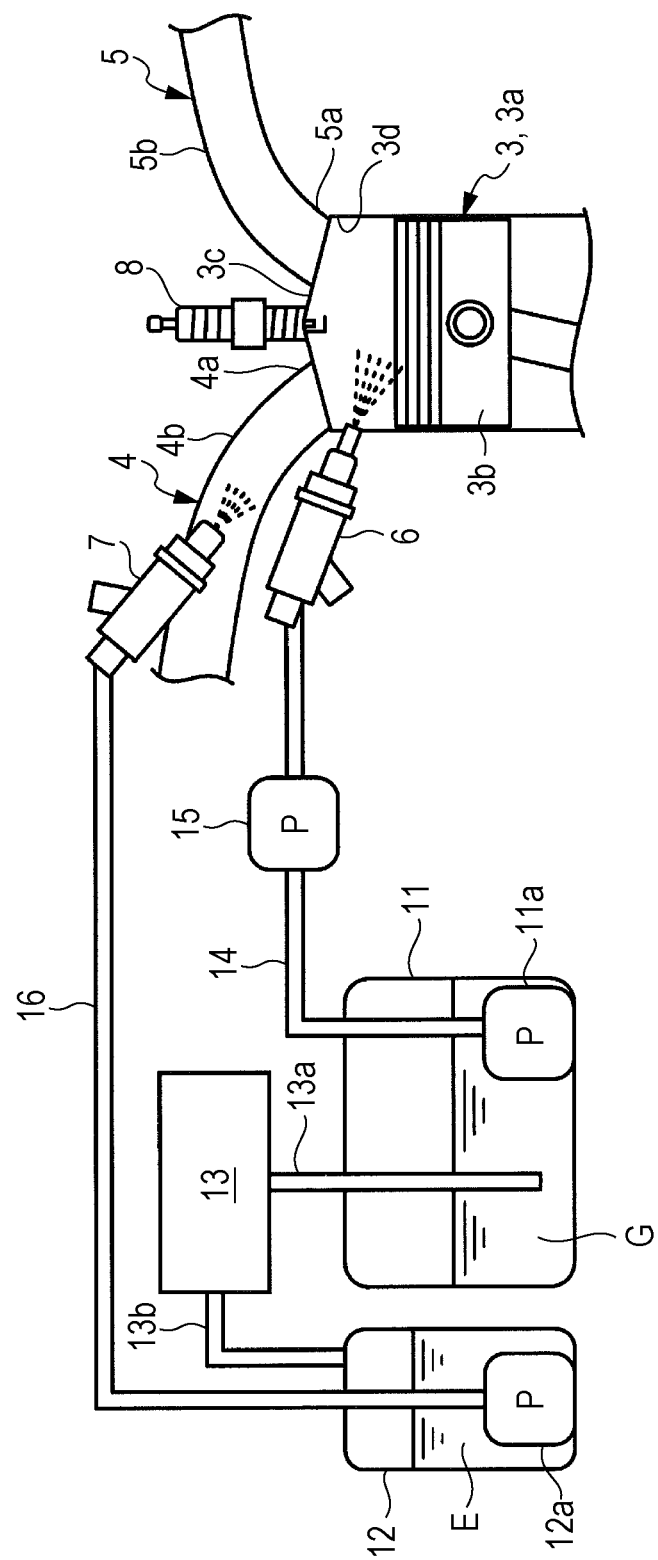
FIG. 1 is a diagram schematically depicting an internal combustion engine to which a control device according to a first embodiment of the present disclosure is applied.

The embodiments will now be described with reference to the accompanying drawings, wherein like reference numerals designate corresponding or identical elements throughout the various drawings.

Hereinafter, with reference to the drawings, preferable embodiments of the present disclosure will be described in detail. FIG. 1 depicts an internal combustion engine (hereinafter referred to as an "engine") 3 to which a control device 1 according to a first embodiment of the present disclosure is applied. The engine 3 is installed in a vehicle (not depicted in the drawing) and uses gasoline G as a low-octane fuel and ethanol E as a high-octane fuel in combination. The gasoline G is commercially available gasoline containing an about 10% ethanol component and is stored in a first fuel tank 11. The ethanol E is ethanol containing an about 60% ethanol component, the octane number thereof is higher than the octane number of the gasoline G, and the ethanol E is stored in a second fuel tank 12. In the first fuel tank 11 and the second fuel tank 12, low-pressure pumps 11a and 12a are respectively provided.

Figure 2:
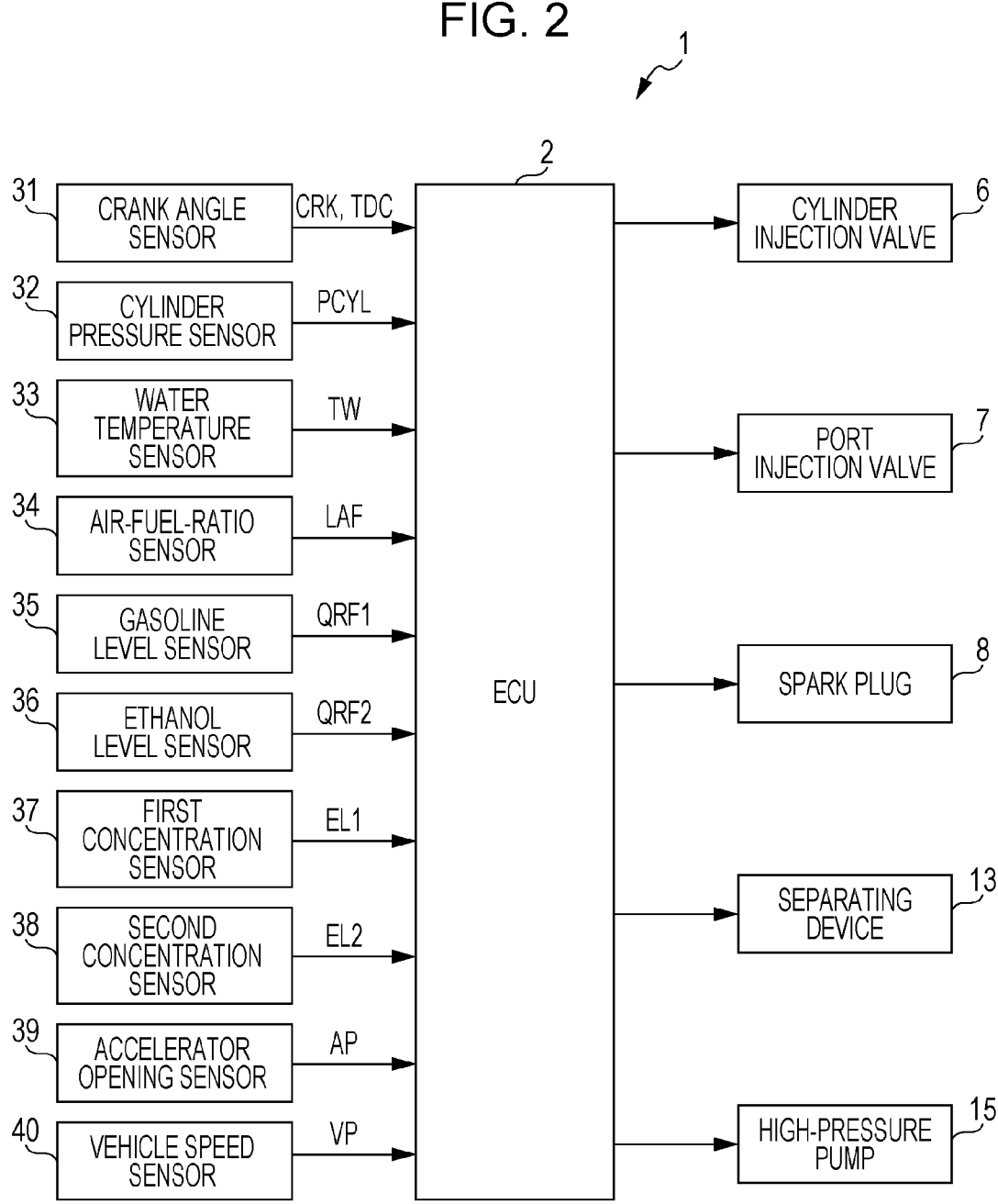
FIG. 2 is a block diagram depicting an ECU and so forth of the control device.

In this embodiment, the ethanol E is generated from the gasoline G by a separating device 13. The separating device 13 generates the ethanol E by separating the ethanol component from the gasoline G supplied via a passage 13a from the first fuel tank 11 and supplies the generated ethanol E to the second fuel tank 12 via a passage 13b. The operation of the separating device 13 is controlled by an ECU 2, which will be described later, of the control device 1 (see FIG. 2).

The engine 3 has, for example, four cylinders 3a (only one of the four cylinders 3a is depicted in the drawing). Between a piston 3b and a cylinder head 3c of each cylinder 3a, a combustion chamber 3d is formed. To the combustion chamber 3d, an inlet passage 4 is connected via an inlet port 4a and an inlet manifold 4b and an outlet passage 5 is connected via an outlet port 5a and an outlet manifold 5b.

Moreover, on the side of the cylinder head 3c, a cylinder injection valve 6 is provided, and, on the inlet manifold 4b, a port injection valve 7 is provided. Furthermore, on the cylinder head 3c, a spark plug 8 for igniting an air fuel mixture of fuel and air, the air fuel mixture generated in the combustion chamber 3d, is provided.

The cylinder injection valve 6 has a tip with a nozzle hole (not depicted in the drawing), the tip provided so as to face the combustion chamber 3d, and is connected to the first fuel tank 11 via a gasoline supply passage 14 and a high-pressure pump 15 provided at some midpoint of the gasoline supply passage 14. The port injection valve 7 has a tip with a nozzle hole (not depicted in the drawing), the tip provided so as to face the inlet port 4a, and is connected to the second fuel tank 12 via an ethanol supply passage 16.

With the above-described configuration, the gasoline G is supplied to the cylinder injection valve 6 from the first fuel tank 11 via the gasoline supply passage 14 in a state in which the gasoline G is pressurized by the high-pressure pump 15, and is injected directly into the combustion chamber 3d from the cylinder injection valve 6. The pressure of the gasoline G which is supplied to the cylinder injection valve 6 is changed by control of the operation of the high-pressure pump 15 which is performed by the ECU 2. Moreover, the ethanol E is supplied to the port injection valve 7 from the second fuel tank 12 via the ethanol supply passage 16 and is injected into the inlet port 4a from the port injection valve 7.

Furthermore, in the engine 3, a crank angle sensor 31, a cylinder pressure sensor 32, and a water temperature sensor 33 are provided, and, in the outlet passage 5, an air-fuel-ratio sensor 34 is provided. The crank angle sensor 31 outputs a CRK signal and a TDC signal, which are pulse signals, to the ECU 2 (see FIG. 2). The CRK signal is output at each predetermined crank angle (1°, for example). The ECU 2 calculates the number of revolutions (hereinafter referred to as the "engine RPM") NE of the engine 3 based on this CRK signal. Moreover, the TDC signal is a signal indicating that, in any one of the cylinders 3a, the piston 3b is located near top dead center at the start of an intake stroke. When there are four cylinders 3a as in this embodiment, the TDC signal is output at each crank angle of 180°.

The above-described cylinder pressure sensor 32 is provided for each cylinder 3a, and detects the pressure (hereinafter referred to as the "cylinder pressure") PCYL inside the cylinder 3a and outputs the detection signal thus obtained to the ECU 2. The water temperature sensor 33 detects the temperature (hereinafter referred to as the "engine water temperature") TW of cooling water of the engine 3 and outputs the detection signal thus obtained to the ECU 2. The air-fuel-ratio sensor 34 detects the air fuel ratio LAF of the air fuel mixture burned in the combustion chamber 3d and outputs the detection signal thus obtained to the ECU 2. Furthermore, in the engine 3, a cylinder discrimination sensor (not depicted in the drawing) is provided, and the cylinder discrimination sensor outputs, to the ECU 2, a cylinder discrimination signal which is a pulse signal for discriminating one cylinder 3a from other cylinders 3a. The ECU 2 discriminates the crank angular position of each cylinder 3a from the crank angular positions of the other cylinders 3a based on the cylinder discrimination signal and the above-described CRK signal and TDC signal.

Moreover, in the first and second fuel tanks 11 and 12, a gasoline level sensor 35 and an ethanol level sensor 36 are respectively provided. The gasoline level sensor 35 detects the quantity (hereinafter referred to as the "gasoline level") QRF1 of the gasoline G stored in the first fuel tank 11 and outputs the detection signal thus obtained to the ECU 2 (see FIG. 2). The ethanol level sensor 36 detects the quantity (hereinafter referred to as the "ethanol level") QRF2 of the ethanol E stored in the second fuel tank 12 and outputs the detection signal thus obtained to the ECU 2.

Furthermore, in the first and second fuel tanks 11 and 12, a first concentration sensor 37 and a second concentration sensor 38 are respectively provided. The first concentration sensor 37 detects the concentration (hereinafter referred to as the "first ethanol concentration") EL1 of the ethanol component contained in the gasoline G stored in the first fuel tank 11 and outputs the detection signal thus obtained to the ECU 2 (see FIG. 2). The second concentration sensor 38 detects the concentration (hereinafter referred to as the "second ethanol concentration") EL2 of the ethanol component contained in the ethanol E stored in the second fuel tank 12 and outputs the detection signal thus obtained to the ECU 2.

Furthermore, to the ECU 2, a detection signal indicating the amount (hereinafter referred to as the "accelerator opening") AP of operation of an accelerator pedal (not depicted in the drawing) of the vehicle is output from an accelerator opening sensor 39 and a detection signal indicating the vehicle speed VP of the vehicle is output from a vehicle speed sensor 40.

The ECU 2 is formed as a microcomputer including a CPU, RAM, ROM, and an I/O interface (which are not depicted in the drawing). In response to the detection signals from the above-described sensors 31 to 40, the ECU 2 controls the fuel injection time and the injection timing of each of the cylinder injection valve 6 and the port injection valve 7 and the ignition timing of the spark plug 8 in accordance with a control program stored in the ROM and controls the operation of the above-described separating device 13 and high-pressure pump 15.

Figure 3:
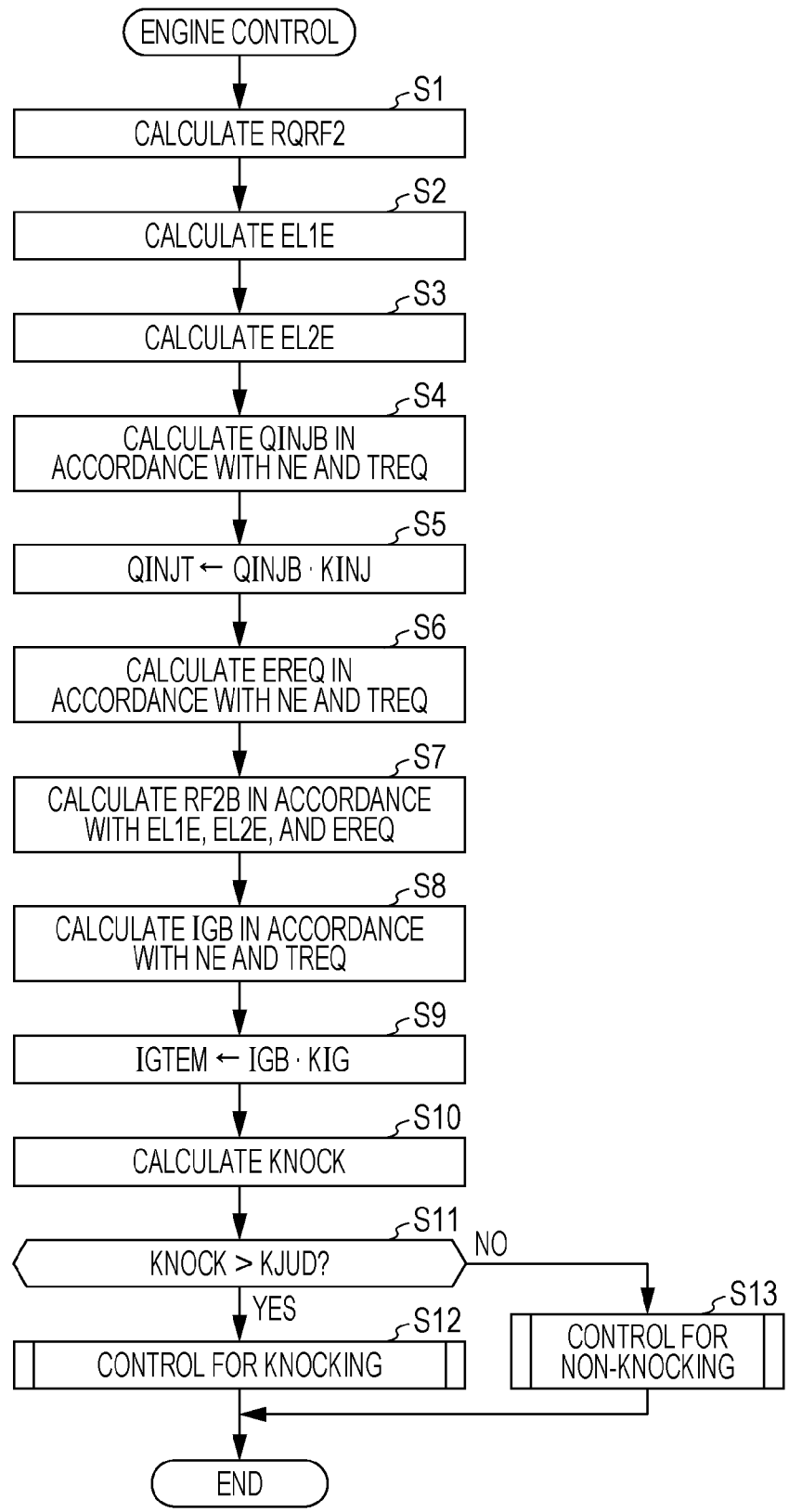
FIG. 3 is a flowchart of engine control processing which is performed by the ECU.

Next, with reference to FIGS. 3 to 7, processing which is performed by the ECU 2 will be described. Engine control processing depicted in FIG. 3 is processing for controlling the injection time of each of the cylinder injection valve 6 and the port injection valve 7 and the ignition timing of the spark plug 8 for each cylinder 3a and is repeatedly performed in synchronism with the generation of the TDC signal. First, in Step 1 ("S1" in FIG. 3; the other steps will be abbreviated in the same manner in the drawings) of FIG. 3, an ethanol level ratio RQRF2 is calculated by dividing the detected ethanol level QRF2 by the sum of the detected gasoline level QRF1 and the detected ethanol level QRF2 [RQRF2=QRF2/(QRF1+QRF2)].

Then, by correcting the detected first ethanol concentration EL1, a first estimated ethanol concentration EL1E is calculated (Step 2), and, by correcting the detected second ethanol concentration EL2, a second estimated ethanol concentration EL2E is calculated (Step 3). In this case, the determination that knocking is occurring in the engine 3 which is made in Step 11, which will be described later, makes the first and second estimated ethanol concentrations EL1 and EL2 corrected to have smaller values.

Next, by searching a predetermined map (not depicted in the drawing) in accordance with the engine RPM NE and a required torque TREQ of the engine 3, a basic fuel injection quantity QINJB is calculated (Step 4). The required torque TREQ is calculated by searching a predetermined map (not depicted in the drawing) in accordance with the detected vehicle speed VP and the detected accelerator opening AP. Then, by multiplying the basic fuel injection quantity QINJB thus calculated by a correction coefficient KINJ, a total fuel injection quantity QINJT is calculated (Step 5). The correction coefficient KINJ is calculated in accordance with a predetermined feedback control algorithm such that, for example, the detected air fuel ratio LAF becomes a predetermined target air fuel ratio. Moreover, the total fuel injection quantity QINJT is a target value of the sum of the injection quantity of the cylinder injection valve 6 (hereinafter referred to as the "cylinder injection quantity") and the injection quantity of the port injection valve 7 (hereinafter referred to as the "port injection quantity").

Then, by searching a predetermined map (not depicted in the drawing) in accordance with the engine RPM NE and the required torque TREQ, a required ethanol concentration EREQ is calculated (Step 6). The required ethanol concentration EREQ is a required value of the ethanol concentration of the fuel which is supplied to the inside of the combustion chamber 3d, and, in the above-described map, the larger the required torque TREQ is, the greater value to which the required ethanol concentration EREQ is set. Then, by searching a predetermined map (not depicted in the drawing) in accordance with the first and second estimated ethanol concentrations EL1E and EL2E calculated in Steps 2 and 3, respectively, and the required ethanol concentration EREQ calculated in Step 6, a basic port injection ratio RF2B is calculated (Step 7). The basic port injection ratio RF2B is a basic value of the ratio of the port injection quantity to the sum of the cylinder injection quantity and the port injection quantity, and, in the above-described map, the basic port injection ratio RF2B is set such that the concentration of ethanol in the fuel which is supplied to the inside of the combustion chamber 3d becomes the required ethanol concentration EREQ.

Next, by searching a predetermined map (not depicted in the drawing) in accordance with the engine RPM NE and the required torque TREQ, basic ignition timing IGB is calculated (Step 8). Then, by multiplying the calculated basic ignition timing IGB by a correction coefficient KIG, temporary ignition timing IGTEM is calculated (Step 9). The correction coefficient KIG is calculated based on the detected engine water temperature TW or the like. In this way, the temporary ignition timing IGTEM is set to optimum ignition timing of the spark plug 8 with which the efficiency of the engine 3 is maximized.

Next, based on the detected cylinder pressure PCYL, the knock intensity KNOCK of the engine 3 is calculated (Step 10). The calculation method is the same as the method disclosed in, for example, Japanese Patent No. 4773888 granted to the present applicant, the entire contents of which are incorporated herein by reference. Thus, the detailed explanations of the method will be omitted. Then, it is determined whether or not the calculated knock intensity KNOCK is greater than a predetermined determination value KJUD (Step 11).

If the result in Step 11 is YES (KNOCK>KJUD), it is determined that knocking of the engine 3 is occurring and control processing for knocking is performed (Step 12), and the present processing is ended. On the other hand, if the result in Step 11 is NO (KNOCK≤KJUD), it is determined that knocking of the engine 3 has not occurred and control processing for non-knocking is performed (Step 13), and the present processing is ended.

Next, with reference to FIG. 4, the control processing for knocking which is performed in Step 12 of FIG. 3 will be described. First, in Step 21 of FIG. 4, by searching a predetermined map (not depicted in the drawing) in accordance with the ethanol level ratio RQRF2 calculated in Step 1 of FIG. 3, the knock intensity KNOCK calculated in Step 10 of FIG. 3, the engine RPM NE, and the required torque TREQ, an addition term COARF2 is calculated. In this map, the addition term COARF2 is set at a positive value, and the details of this setting will be described later.

Then, by adding the addition term COARF2 calculated in Step 21 to a previous value CORF2Z of a port injection ratio correction term which is a correction value of the above-mentioned basic port injection ratio RF2B, a current port injection ratio correction term CORF2 is calculated (Step 22). The previous value CORF2Z of the port injection ratio correction term is set at a predetermined upper limit at the time of startup of the engine 3. Next, by adding the port injection ratio correction term CORF2 calculated in Step 22 to the basic port injection ratio RF2B calculated in Step 7 of FIG. 3, a port injection ratio RF2 is calculated (Step 23).

Then, it is determined whether or not the calculated port injection ratio RF2 is higher than a predetermined upper limit RF2LMH which is a positive value smaller than or equal to 1.0 (Step 24). If the result is NO (RF2≤RF2LMH), by searching a predetermined map (not depicted in the drawing) in accordance with the ethanol level ratio RQRF2, a first ignition timing correction term COIG1 is calculated (Step 25). In this map, the first ignition timing correction term COIG1 is set at a positive value, and the details of this setting will be described later. Next, the calculated first ignition timing correction term COIG1 is set as an ignition timing correction term COIG (Step 26), and the procedure proceeds to Step 30. This ignition timing correction term COIG is a correction term which corrects the temporary ignition timing IGTEM.

On the other hand, if the result in Step 24 is YES and the port injection ratio RF2 is higher than the predetermined upper limit RF2LMH, the port injection ratio RF2 is set at the upper limit RF2LMH (Step 27). Then, by searching a predetermined map (not depicted in the drawing) in accordance with the ethanol level ratio RQRF2, a second ignition timing correction term COIG2 is calculated (Step 28). In this map, the second ignition timing correction term COIG2 is set at a positive value, and the details of this setting will be described later. Next, the calculated second ignition timing correction term COIG2 is set as the ignition timing correction term COIG (Step 29), and the procedure proceeds to Step 30.

In Step 30 following Step 26 or 29, by multiplying the total fuel injection quantity QINJT calculated in Step 5 of FIG. 3 by the port injection ratio RF2 calculated in Step 23, a target port injection quantity QINJ2 is calculated. Then, based on the calculated target port injection quantity QINJ2, a final port injection time TOUT2 which is a target value of a valve opening time of the port injection valve 7 is calculated (Step 31). When the final port injection time TOUT2 is calculated in the manner described above, the port injection valve 7 is opened with port injection start timing calculated by unillustrated processing and the valve opening time of the port injection valve 7 is controlled so as to be the final port injection time TOUT2. As a result, the port injection quantity is controlled so as to be the target port injection quantity QINJ2 calculated in Step 30.

Next, by subtracting the target port injection quantity QINJ2 calculated in Step 30 from the total fuel injection quantity QINJT, a target cylinder injection quantity QINJ1 is calculated (Step 32), and, based on the calculated target cylinder injection quantity QINJ1, a final cylinder injection time TOUT1 which is a target value of a valve opening time of the cylinder injection valve 6 is calculated (Step 33). When the final cylinder injection time TOUT1 is calculated in the manner described above, the cylinder injection valve 6 is opened with cylinder injection start timing calculated by unillustrated processing and the valve opening time of the cylinder injection valve 6 is controlled so as to be the final cylinder injection time TOUT1. As a result, the cylinder injection quantity is controlled so as to be the target cylinder injection quantity QINJ1 calculated in Step 32.

In Step 34 following Step 33, by adding the ignition timing correction term COIG calculated in Step 26 or 29 to the temporary ignition timing IGTEM calculated in Step 9 of FIG. 3, ignition timing IG is calculated. When the ignition timing IG is calculated in the manner described above, the ignition timing of the spark plug 8 is controlled so as to be the calculated ignition timing IG. Incidentally, the greater the ignition timing IG is, the further the ignition timing IG is retarded. Then, a setting flag F_SET and a subtraction flag F_SUBT, which will be described later, are set at "1" (Step 35), and the present processing is ended. Incidentally, the setting flag F_SET and the subtraction flag F_SUBT are reset to "0" at the time of startup of the engine 3.

As described above, in the control processing for knocking, by adding the port injection ratio correction term CORF2 to the basic port injection ratio RF2B by performing Steps 21 to 23, a correction to increase the port injection ratio RF2 is made. In this case, in the above-described map, the higher the ethanol level ratio RQRF2 is, the greater value to which the addition term COARF2 which is added to the port injection ratio correction term CORF2 is set, and, the higher the knock intensity KNOCK is, the greater value to which the addition term COARF2 which is added to the port injection ratio correction term CORF2 is set. As a result, the higher the ethanol level ratio RQRF2 is and the higher the knock intensity KNOCK is, the larger the amount of correction made to increase the port injection ratio RF2 becomes. Incidentally, the port injection ratio correction term CORF2 is limited to a value smaller than or equal to the above-described upper limit by limit processing (not depicted in the drawing).

Moreover, in the control processing for knocking, by adding the ignition timing correction term COIG to the basic ignition timing IGB by performing Steps 25, 26, 28, 29, and 34, a correction to retard the ignition timing IG is made. In this case, in the above-described map, the lower the ethanol level ratio RQRF2 is, the greater values to which the first and second ignition timing correction terms COIG1 and COIG2 which are used as the ignition timing correction term COIG are set. As a result, the lower the ethanol level ratio RQRF2 is, the larger the amount of correction made to retard the ignition timing IG becomes. Furthermore, the first and second ignition timing correction terms COIG1 and COIG2 are set at values by which knocking of the engine 3 can be suppressed in accordance with the influence of adhesion of the ethanol E to the wall surface of the inlet port 4a and the influence of a time delay observed before the fuel injected from the port injection valve 7 actually flows into the cylinder 3a (hereinafter referred to as a "time delay in the flow of the port injected fuel").

Moreover, the port injection ratio RF2 to which a correction has been made to increase the port injection ratio RF2 is limited to a value smaller than or equal to the upper limit RF2LMH (Steps 24 and 27). Furthermore, as the ignition timing correction term COIG, the second ignition timing correction term COIG2 is used if the port injection ratio RF2 is limited to the upper limit RF2LMH (Step 24: YES); the first ignition timing correction term COIG1 is used if the port injection ratio RF2 is not limited to the upper limit RF2LMH (Step 24: NO). In the above-described map, for the ethanol level ratio RQRF2 as a whole, the second ignition timing correction term COIG2 is set at a value greater than the first ignition timing correction term COIG1. As a result, when the port injection ratio RF2 to which a correction has been made to increase the port injection ratio RF2 is limited to the upper limit RF2LMH, the amount of correction made to retard the ignition timing IG becomes larger than the amount of correction observed when the port injection ratio RF2 to which a correction has been made to increase the port injection ratio RF2 is not limited to the upper limit RF2LMH.

Next, with reference to FIGS. 5 to 7, the control processing for non-knocking which is performed in Step 13 of FIG. 3 will be described. First, in Step 41 of FIG. 5, it is determined whether or not the required torque TREQ is larger than a predetermined value TKNOCK. If the result is NO (TREQ≤TKNOCK), it is determined that the engine 3 is not in a load region in which knocking occurs. Then, the basic port injection ratio RF2B calculated in Step 7 of FIG. 3 is set as a port injection ratio RF2 without change (Step 42).

Figure 4:
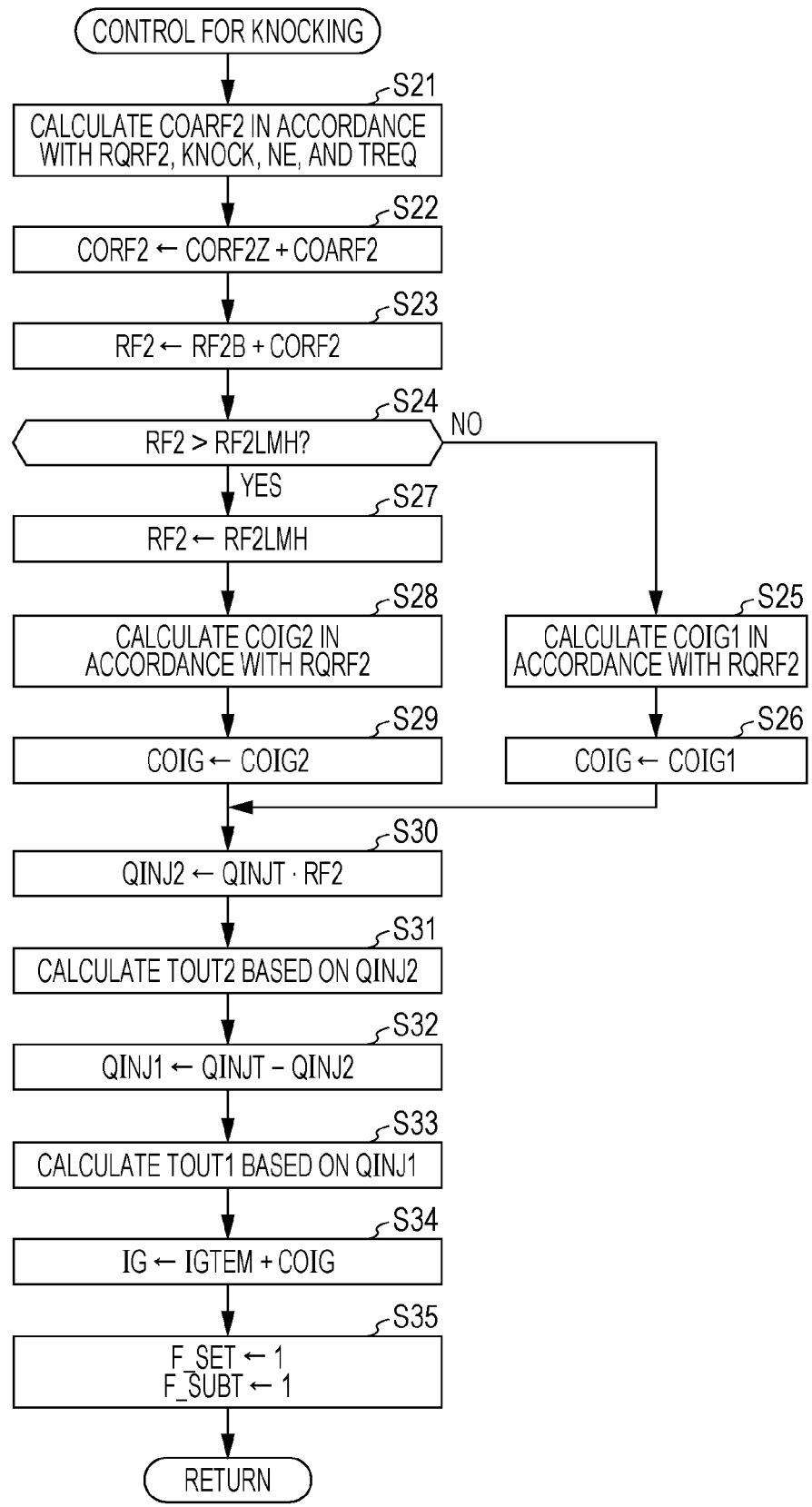
FIG. 4 is a flowchart of a subroutine of control processing for knocking which is performed in Step 12 of FIG. 3.

Then, in Steps 43 to 46, in a manner similar to Steps 30 to 33 of FIG. 4, the target port injection quantity QINJ2, the final port injection time TOUT2, the target cylinder injection quantity QINJ1, and the final cylinder injection time TOUT1 are calculated. In this way, the port injection quantity is controlled so as to be the target port injection quantity QINJ2 calculated in Step 43 and the cylinder injection quantity is controlled so as to be the target cylinder injection quantity QINJ1 calculated in Step 45.

Next, the ignition timing IG is set to the temporary ignition timing IGTEM calculated in Step 9 of FIG. 3 (Step 47), and the present processing is ended. When the ignition timing IG is calculated in the manner described above, as in the case of Step 34, the ignition timing of the spark plug 8 is controlled so as to be the ignition timing IG calculated in Step 47.

On the other hand, if the result in Step 41 is YES (TREQ>TKNOCK), it is determined that the engine 3 is in a load region in which knocking occurs. Then, in Step 51 of FIG. 6, it is determined whether or not the setting flag F_SET is "1". If the result is YES (F_SET=1), it is determined whether or not the ethanol level ratio RQRF2 is greater than or equal to a predetermined value RQRB (Step 52).

If the result in Step 52 is YES (RQRF2≥RQRB), by searching a predetermined map (not depicted in the drawing) in accordance with the ethanol level ratio RQRF2, a first subtraction time TIMA1 is calculated (Step 53). In this map, the first subtraction time TIMA1 is set at a positive value, and the details of this setting will be described later. Then, by dividing a predetermined basic subtraction term COSIB by the calculated first subtraction time TIMA1, a subtraction term COSIG is calculated (Step 54). Next, the setting flag F_SET is reset to "0" to end the calculation and setting of the subtraction term COSIG (Step 55), and the procedure proceeds to Step 58.

On the other hand, if the result in Step 52 is NO and the ethanol level ratio RQRF2 is smaller than the predetermined value RQRB, by searching a predetermined map (not depicted in the drawing) in accordance with the ethanol level ratio RQRF2, a second subtraction time TIMA2 is calculated (Step 56). In this map, the second subtraction time TIMA2 is set at a positive value, and the details of this setting will be described later. Then, by dividing the above-described basic subtraction term COSIB by the calculated second subtraction time TIMA2, a subtraction term COSIG is calculated (Step 57). Next, Step 55 is performed to end the calculation and setting of the subtraction term COSIG (F_SET←0), and the procedure proceeds to Step 58.

On the other hand, if the result in Step 51 is NO (F_SET=0), Steps 52 to 57 are skipped and the procedure proceeds to Step 58.

In Step 58, it is determined whether or not the subtraction flag F_SUET is "1". If the result is YES (F_SUBT=1), by subtracting the subtraction term COSIG calculated in Step 54 or 57 from a previous value COIGZ of the ignition timing correction term set in Step 26 or 29 of FIG. 4, a current ignition timing correction term COIG is calculated (Step 59).

Next, it is determined whether or not the ignition timing correction term COIG calculated in Step 59 is smaller than or equal to 0 (Step 60). If the result is NO (COIG >0), by adding the ignition timing correction term COIG calculated in Step 59 to the temporary ignition timing IGTEM calculated in Step 9 of FIG. 3, the ignition timing IG is calculated (Step 61), and the procedure proceeds to Step 71 of FIG. 7. When the ignition timing IG is calculated in the manner described above, as in the case of Step 34 or the like of FIG. 4, the ignition timing of the spark plug 8 is controlled so as to be the ignition timing IG calculated in Step 61.

On the other hand, if the result in Step 60 is YES and the ignition timing correction term COIG becomes smaller than or equal to 0, the subtraction flag F_SUBT is reset to "0" to end the subtraction processing performed in Step 59 for calculating the ignition timing correction term COIG (Step 62). Then, the ignition timing IG is set to the temporary ignition timing IGTEM calculated in Step 9 of FIG. 3 (Step 63), and the procedure proceeds to Step 71 of FIG. 7.

Figure 7:
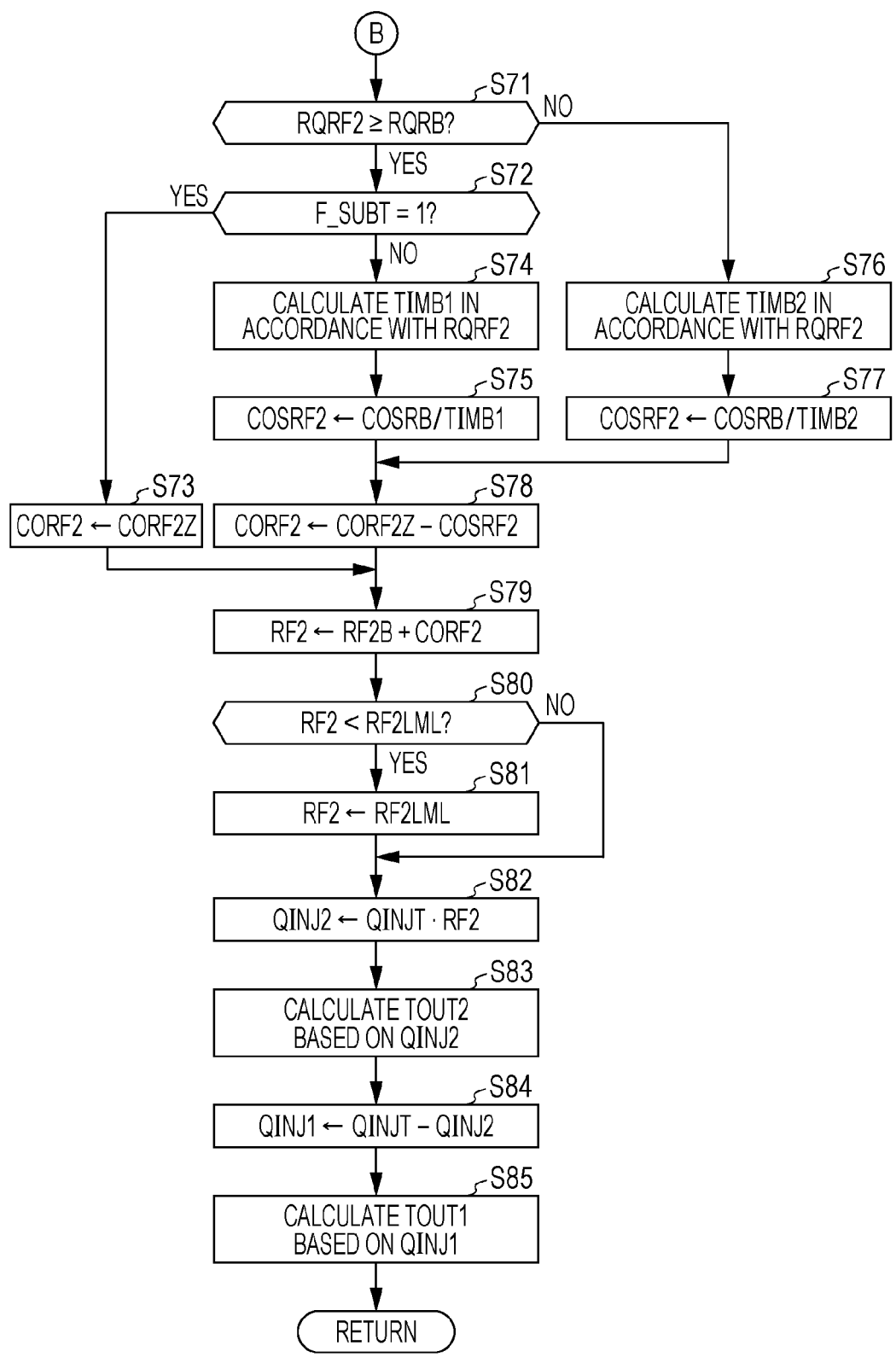
FIG. 7 is a flowchart of part of the control processing for non-knocking, the part continued from FIG. 6.

On the other hand, if the result in Step 58 is NO (F_SUET=0), the ignition timing IG is set to the temporary ignition timing IGTEM by performing Step 63, and the procedure proceeds to Step 71 of FIG. 7.

Figure 6:
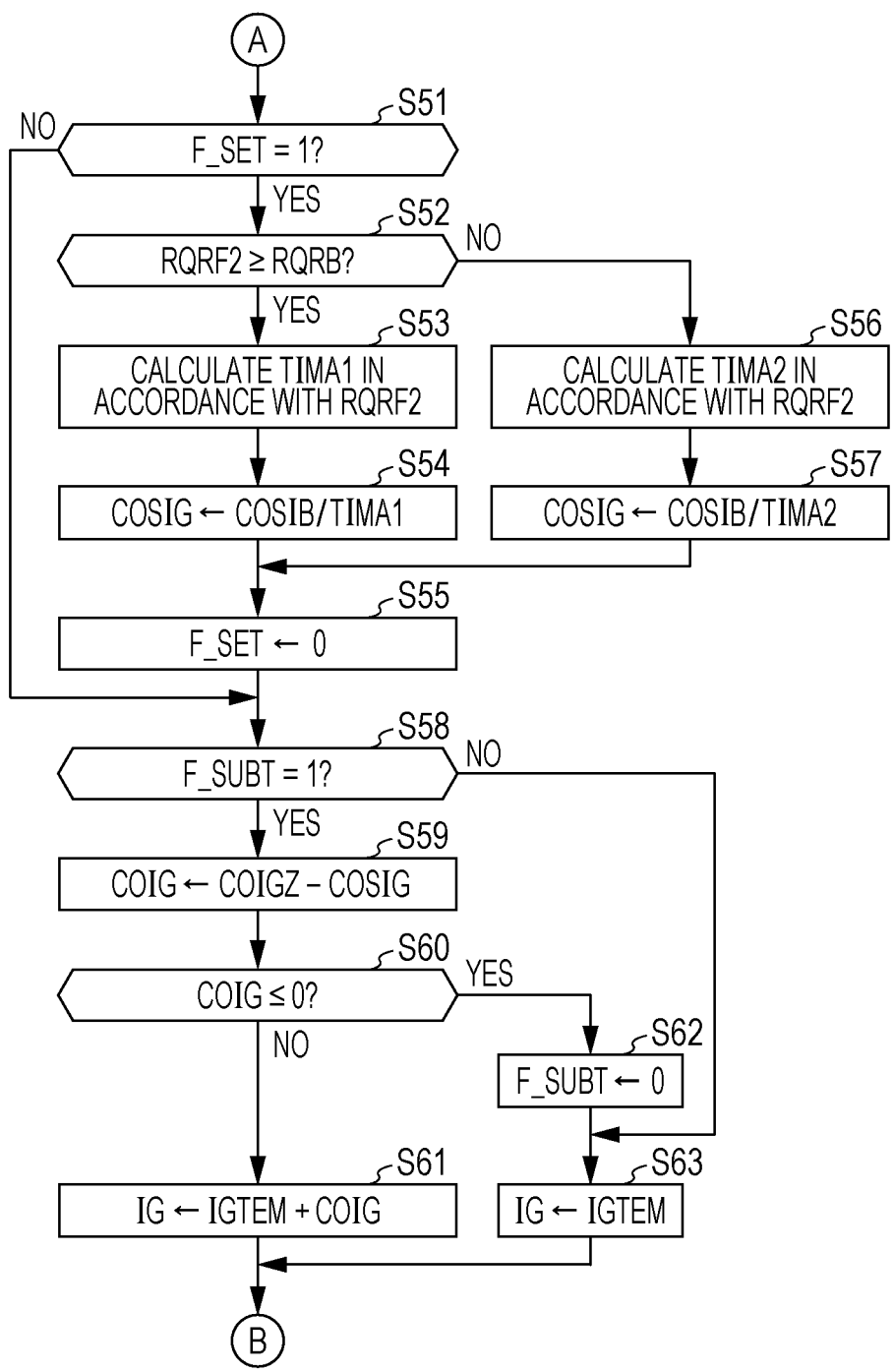
FIG. 6 is a flowchart of processing of the control processing for non-knocking, the processing which is different from the processing of FIG. 5.

In Step 71 of FIG. 7 following Step 61 or 63 of FIG. 6, it is determined whether or not the ethanol level ratio RQRF2 is greater than or equal to the predetermined value RQRB. If the result is YES (RQRF2≥RQRB), it is determined whether or not the subtraction flag F_SUBT is "1" (Step 72). If the result is YES (F_SUBT=1), that is, if the subtraction processing performed in Step 59 for calculating the ignition timing correction term COIG is being performed, the previous value CORF2Z of the port injection ratio correction term is set as a current port injection ratio correction term CORF2 (Step 73), and the procedure proceeds to Step 79 which will be described later.

On the other hand, if the result in Step 72 is NO (F_SUBT=0) and the subtraction processing for calculating the ignition timing correction term COIG is not being performed, by searching a predetermined map (not depicted in the drawing) in accordance with the ethanol level ratio RQRF2, a first subtraction time TIMB1 is calculated (Step 74). In this map, the first subtraction time TIMB1 is set at a positive value, and the details of this setting will be described later. Then, by dividing a predetermined basic subtraction term COSRB by the calculated first subtraction time TIMB1, a subtraction term COSRF2 is calculated (Step 75), and the procedure proceeds to Step 78.

On the other hand, if the result in Step 71 is NO (RQRF2<RQRB), by searching a predetermined map (not depicted in the drawing) in accordance with the ethanol level ratio RQRF2, a second subtraction time TIMB2 is calculated (Step 76). In this map, the second subtraction time TIMB2 is set at a positive value, and the details of this setting will be described later. Then, by dividing the above-described basic subtraction term COSRB by the calculated second subtraction time TIMB2, a subtraction term COSRF2 is calculated (Step 77), and the procedure proceeds to Step 78.

In Step 78 following Step 75 or 77, by subtracting the subtraction term COSRF2 calculated in Step 75 or 77 from the previous value CORF2Z of the port injection ratio correction term, a current port injection ratio correction term CORF2 is calculated. Then, the procedure proceeds to Step 79.

In Step 79 following Step 73 or 78, by adding the port injection ratio correction term CORF2 set and calculated in Step 73 or 78 to the basic port injection ratio RF2B calculated in Step 7 of FIG. 3, a port injection ratio RF2 is calculated. Then, it is determined whether or not the calculated port injection ratio RF2 is smaller than a predetermined lower limit RF2LML (Step 80). The lower limit RF2LML is set at a positive value smaller than the upper limit RF2LMH which is used in Step 24 of FIG. 4.

If the result in Step 80 is YES (RF2<RF2LML), the port injection ratio RF2 is set at the lower limit RF2LML (Step 81), and the procedure proceeds to Step 82. On the other hand, if the result in Step 80 is NO and the port injection ratio RF2 is greater than or equal to the predetermined lower limit RF2LML, Step 81 is skipped and the procedure proceeds to Step 82.

In Steps 82 to 85, in a manner similar to Steps 30 to 33 of FIG. 4, the target port injection quantity QINJ2, the final port injection time TOUT2, the target cylinder injection quantity QINJ1, and the final cylinder injection time TOUT1 are calculated, and the present processing is ended. In this way, the port injection quantity is controlled so as to be the target port injection quantity QINJ2 calculated in Step 82 and the cylinder injection quantity is controlled so as to be the target cylinder injection quantity QINJ1 calculated in Step 84.

Figure 5:
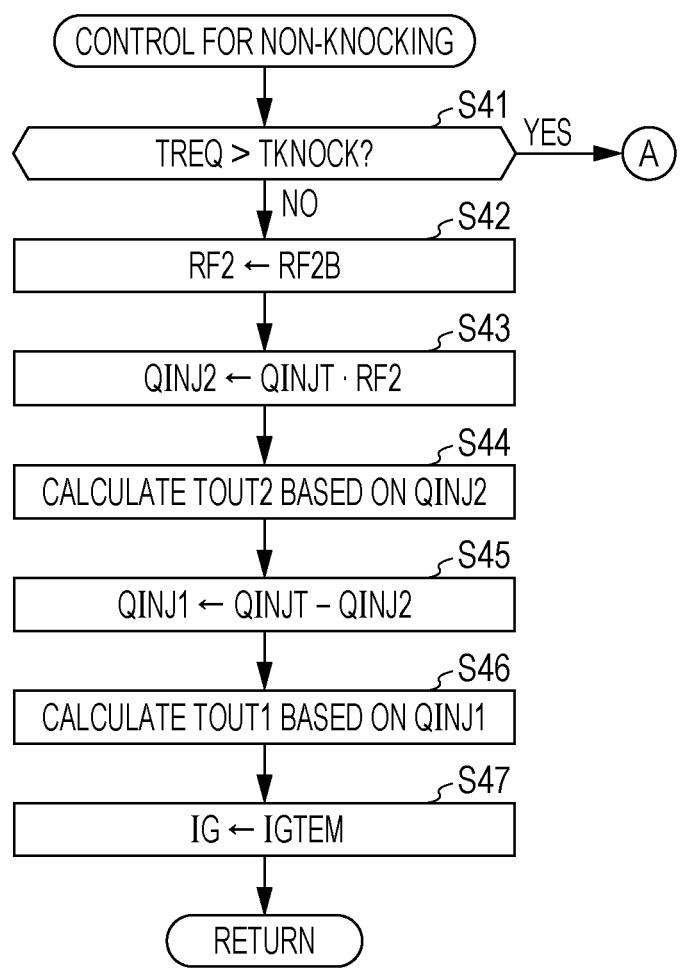
FIG. 5 is a flowchart of a subroutine of control processing for non-knocking which is performed in Step 13 of FIG. 3.

As described above, in the control processing for non-knocking, if the engine 3 is not in a load region in which knocking occurs (Step 41 of FIG. 5: NO), the port injection ratio RF2 is set to the basic port injection ratio RF2B (Step 42) and the ignition timing IG is set to the temporary ignition timing IGTEM (Step 47). Moreover, if the engine 3 is in a load region in which knocking occurs (Step 41: YES), unless knocking occurs at startup of the engine 3, as a result of the subtraction flag F_SUBT being maintained at "0", the ignition timing IG is set at the temporary ignition timing IGTEM (Step 58 of FIG. 6: NO, Step 63).

On the other hand, when the engine 3 is in a load region in which knocking occurs, if the control processing for knocking was performed because it was determined that knocking of the engine 3 had occurred, the subtraction processing for calculating the ignition timing correction term COIG set in this control processing for knocking is performed (Step 59 of FIG. 6).

This subtraction processing for calculating the ignition timing correction term COIG is repeatedly performed until the ignition timing correction term COIG becomes smaller than or equal to 0, and, while this processing is being performed, the ignition timing IG is set at a value obtained by adding the ignition timing correction term COIG to the temporary ignition timing IGTEM (Step 61 of FIG. 6). Then, when the ignition timing correction term COIG becomes smaller than or equal to 0 (Step 60: YES), the subtraction processing for calculating the ignition timing correction term COIG is ended and the subtraction flag F_SUBT is set at "0" (Step 62). After the subtraction processing for calculating the ignition timing correction term COIG is ended, the ignition timing IG is set to the temporary ignition timing IGTEM (Step 58: NO, Step 63). In this way, at the occurrence of knocking of the engine 3, a correction to retard the ignition timing IG relative to the temporary ignition timing IGTEM is made, and, when the occurrence of knocking ceases, the ignition timing IG is gradually returned to the temporary ignition timing IGTEM on the advance side.

Furthermore, the subtraction term COSIG which is subtracted from the ignition timing correction term COIG is calculated by dividing the predetermined basic subtraction term COSIB by the first subtraction time TIMA1 or the second subtraction time TIMA2 (Step 54 or 57 of FIG. 6). In the above-described map, the lower the ethanol level ratio RQRF2 is, the greater values to which these first and second subtraction times TIMA1 and TIMA2 are set (Steps 53 and 56). Moreover, if the ethanol level ratio RQRF2 is greater than or equal to the predetermined value RQRB (Step 52: YES), the first subtraction time TIMA1 is used; if the ethanol level ratio RQRF2 is smaller than the predetermined value RQRB (Step 52: NO), the second subtraction time TIMA2 is used. In the above-described map, for the ethanol level ratio RQRF2 as a whole, the second subtraction time TIMA2 is set at a value greater than the first subtraction time TIMA1. As described above, the lower the ethanol level ratio RQRF2 is, the smaller value to which the subtraction term COSIG is set, whereby the time elapsed before the ignition timing IG is returned to the temporary ignition timing IGTEM is further lengthened.

In addition, in the above-described map, the first subtraction time TIMA1 is set in accordance with the above-described time delay in the flow of the port injected fuel (the time delay observed before the fuel injected from the port injection valve 7 actually flows into the cylinder 3a) and is set at a value which prevents the ignition timing correction term COIG from becoming 0 during the time delay in the flow of the port injected fuel.

Moreover, in the control processing for non-knocking, when the engine 3 is in a load region in which knocking occurs, the subtraction processing for calculating the port injection ratio correction term CORF2 is performed (Step 78 of FIG. 7). Unlike the above-described subtraction processing for calculating the ignition timing correction term COIG, basically, the subtraction processing for calculating the port injection ratio correction term CORF2 is repeatedly performed as long as knocking of the engine 3 does not occur and the engine 3 is in a load region in which knocking occurs.

On the other hand, when the occurrence of knocking of the engine 3 ceases, if the ethanol level ratio RQRF2 is greater than or equal to the predetermined value RQRB (Step 71: YES), from the start of the control processing for non-knocking to the end of the subtraction processing for calculating the ignition timing correction term COIG, the subtraction processing for calculating the port injection ratio correction term CORF2 is not performed and the port injection ratio correction term CORF2 is maintained at the previous value CORF2Z (Step 72: YES, Step 73). As a result, from when the control processing for non-knocking is started till when the ignition timing correction term COIG becomes 0, the port injection ratio correction term CORF2 is maintained at the value obtained by addition performed in the control processing for knocking (Step 22 of FIG. 4). Then, when the subtraction processing for calculating the ignition timing correction term COIG is ended (Step 72: NO), the subtraction processing for calculating the port injection ratio correction term CORF2 is started.

On the other hand, if the ethanol level ratio RQRF2 is smaller than the predetermined value RQRB (Step 71: NO), irrespective of the subtraction processing for calculating the ignition timing correction term COIG, the subtraction processing for calculating the port injection ratio correction term CORF2 is started with the start of the control processing for non-knocking. That is, in this case, the subtraction processing for calculating the ignition timing correction term COIG and the subtraction processing for calculating the port injection ratio correction term CORF2 are performed in parallel.

Moreover, the subtraction term COSRF2 which is subtracted from the previous value CORF2Z of the port injection ratio correction term to calculate the port injection ratio correction term CORF2 is calculated by dividing the predetermined basic subtraction term COSRB by the first subtraction time TIMB1 or the second subtraction time TIMB2 (Step 75 or 77 of FIG. 7). In the above-described map, the lower the ethanol level ratio RQRF2 is, the smaller values to which these first and second subtraction times TIMB1 and TIMB2 are set (Steps 74 and 76). Moreover, if the ethanol level ratio RQRF2 is greater than or equal to the predetermined value RQRB (Step 71: YES), the first subtraction time TIMB1 is used; if the ethanol level ratio RQRF2 is smaller than the predetermined value RQRB (Step 71: NO), the second subtraction time TIMB2 is used. In the above-described map, for the ethanol level ratio RQRF2 as a whole, the second subtraction time TIMB2 is set at a value smaller than the first subtraction time TIMB1. As described above, the lower the ethanol level ratio RQRF2 is, the greater value to which the subtraction term COSRF2 is set, whereby, as a result of the port injection ratio correction term CORF2 decreasing more steeply, the port injection ratio RF2 obtained by the addition of the port injection ratio correction term CORF2 also decreases more steeply.

Incidentally, the port injection ratio correction term CORF2 is limited to a value greater than or equal to a predetermined lower limit by limit processing (not depicted in the drawing).

The reason why, in the engine control processing, a correction to decrease the port injection ratio RF2 is basically made when knocking of the engine 3 is not occurring and a correction to increase the port injection ratio RF2 is made when knocking of the engine 3 is occurring in the manner described above is as follows. That is, the accuracy of the first and second ethanol concentrations EL1 and EL2 detected by the first and second concentration sensors 37 and 38 are not necessarily high because this accuracy is affected by individual differences, age deterioration, and the like of the sensors 37 and 38. Thus, even when the port injection ratio RF2 is calculated by using the first and second estimated ethanol concentrations EL1E and EL2E which are calculated based on the first and second ethanol concentrations EL1 and EL2 and the required ethanol concentration EREQ, the actual ethanol concentration of the fuel which is supplied to the inside of the combustion chamber 3d may become higher than the required ethanol concentration EREQ, which results in unnecessary consumption of the ethanol E, or become lower than the required ethanol concentration EREQ, which results in the frequent occurrence of knocking of the engine 3. With consideration given to the above problem, by making a correction to decrease the port injection ratio RF2 basically when knocking of the engine 3 is not occurring and a correction to increase the port injection ratio RF2 when knocking of the engine 3 is occurring, knocking of the engine 3 is suppressed with consumption of the ethanol E being minimized.

Moreover, the correlation between various component elements in this embodiment and various component elements in the present disclosure is as follows. That is, the cylinder injection valve 6 and the port injection valve 7 in this embodiment correspond to first and second fuel injection valves, respectively, in the present disclosure, and the ECU 2 in this embodiment corresponds to a knocking detecting unit (a knocking detector), a knocking suppressing unit (a knocking suppressor) including a first knocking suppressor and a second knocking suppressor, a knock intensity detecting unit (a knock intensity detector), a limiting unit (a limiter), and a controlling unit in the present disclosure.

Furthermore, the details of the processing in Steps 21 to 23 of FIG. 4 and Steps 73 and 79 of FIG. 7 in this embodiment correspond to high-octane fuel increase control in the present disclosure, and the details of the processing in Steps 25, 26, 28, 29, and 34 of FIG. 4 correspond to a knocking suppressing operation in the present disclosure. In addition, the details of the processing in Steps 78 and 79 of FIG. 7 correspond to high-octane fuel decrease control in the present disclosure, and the details of the processing in Steps 59 and 61 of FIG. 6 correspond to degree-of-knocking-suppression reduction control in the present disclosure.

Figure 8:
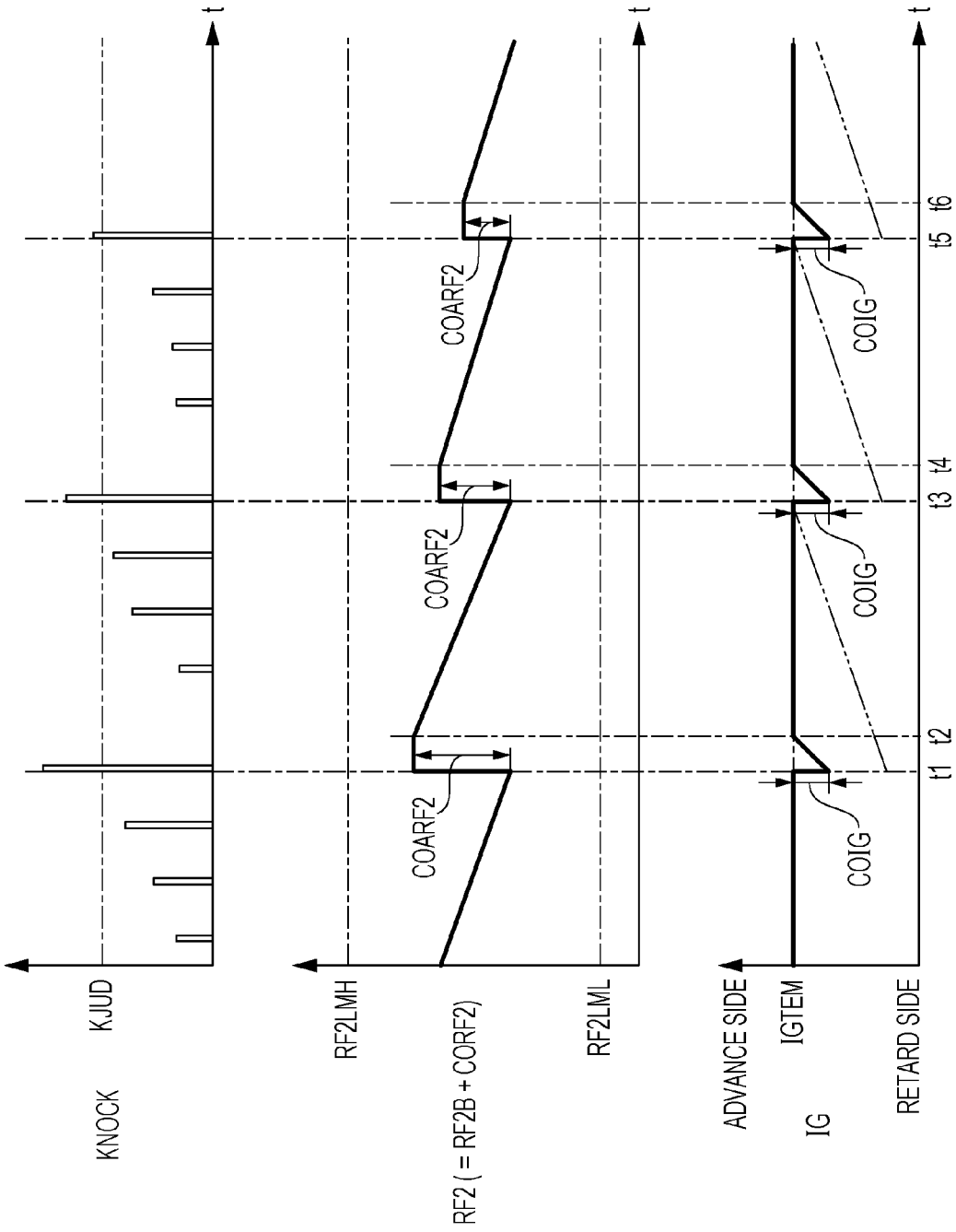
FIG. 8 is a diagram depicting an example of transition of a port injection ratio, ignition timing, and so forth.

Next, with reference to FIGS. 8 to 12, the effect of this embodiment will be described. As depicted in FIG. 8, as a result of the control processing for knocking being performed (Step 12 of FIG. 3, FIG. 4) when it is determined that knocking of the engine 3 is occurring (the knock intensity KNOCK>the determination value KJUD, time points t1, t3, and t5, Step 11 of FIG. 3: YES), a correction to increase the port injection ratio RF2 is made, and, in the early stage thereof, a correction to retard the ignition timing IG is also made. This makes it possible to suppress knocking of the engine 3 appropriately during the above-described time delay in the flow of the port injected fuel and suppress consumption of the ethanol E.

In this case, since the ignition timing IG is a parameter highly responsive to the suppression of knocking of the engine 3, it is possible to obtain the above-described effect effectively. Moreover, since the first and second ignition timing correction terms COIG1 and COIG2 which are used as the amount of correction made to retard the ignition timing IG are set at values by which knocking of the engine 3 can be suppressed in accordance with the influence of adhesion of the ethanol E to the wall surface of the inlet port 4a and the influence of the time delay in the flow of the port injected fuel, it is possible to obtain the above-described effect more effectively. Incidentally, the first and second ignition timing correction terms COIG1 and COIG2 may be calculated in accordance with, in addition to that described above, a parameter correlating with the time delay in the flow of the port injected fuel, such as the engine RPM NE. In this case, the more the time delay in the flow of the port injected fuel becomes, the greater values to which the first and second ignition timing correction terms COIG1 and COIG2 are set.

Moreover, in FIG. 8, chain double-dashed lines indicate a comparative example in which, when knocking of the engine 3 occurs, in order to suppress this knocking, only a correction made to retard the ignition timing IG is performed without a correction made to increase the port injection ratio RF2. The comparative example reveals that, as compared to this embodiment indicated by solid lines, a correction to further retard the ignition timing is made. As described above, according to this embodiment, by making a correction to increase the port injection ratio RF2 and a correction to retard the ignition timing IG in parallel, it is possible to reduce the amount of correction made to retard the ignition timing IG, which makes it possible to suppress a reduction in the efficiency of the engine 3 caused by a correction to retard the ignition timing IG.

Furthermore, as indicated in FIG. 8 in a period from a time point t2 to a time point immediately before a time point t3, a period from a time point t4 to a time point immediately before a time point t5, and a period after a time point t6, the port injection ratio RF2 is gradually decreased (Steps 78 and 79 of FIG. 7) as a result of the above-described subtraction processing for calculating the port injection ratio correction term CORF2 being performed while the control processing for non-knocking is being performed after the end of the control processing for knocking. As a result, it is possible to suppress unnecessary consumption of the ethanol E. In this case, since the port injection ratio RF2 is gradually decreased, it is possible to prevent the occurrence of knocking of the engine 3 caused by a sudden decrease in the octane number of the fuel in the combustion chamber 3d.

Moreover, the ignition timing correction term COIG by which a correction to retard the ignition timing IG is made is set with the occurrence of knocking of the engine 3, and, when the occurrence of knocking ceases, subtraction is performed to calculate a current ignition timing correction term COIG (Step 59 of FIG. 6) as a result of the above-described subtraction processing for calculating the ignition timing correction term COIG being performed. As depicted in FIG. 8, until the ignition timing correction term COIG becomes 0 as a result of the subtraction processing for calculating the ignition timing correction term COIG being performed (a period from the time point t1 to a time point immediately before the time point t2, a period from the time point t3 to a time point immediately before the time point t4, and a period from the time point t5 to a time point immediately before the time point t6, Step 60: NO), the port injection ratio RF2 is maintained in a state in which the port injection ratio RF2 has been increased by the control processing for knocking (Step 72 of FIG. 7: YES, Step 73). Then, when the ignition timing correction term COIG becomes smaller than or equal to 0 (Step 60: YES), the subtraction processing for calculating the ignition timing correction term COIG is ended (Step 62), and the ignition timing IG returns to the temporary ignition timing IGTEM, the subtraction processing for calculating the port injection ratio correction term CORF2 is started (Step 72: NO, Step 78).

As described above, since the ignition timing IG is preferentially returned to the temporary ignition timing IGTEM, that is, the optimum ignition timing when the occurrence of knocking of the engine 3 ceases, it is possible to further suppress a reduction in the efficiency of the engine 3 caused by a correction to retard the ignition timing IG. Moreover, since the port injection ratio RF2 is decreased by performing the subtraction processing for calculating the port injection ratio correction term CORF2 after the ignition timing correction term COIG becomes 0 and the ignition timing IG returns to the temporary ignition timing IGTEM, it is possible to suppress the reoccurrence of knocking of the engine 3 with the execution of the subtraction processing for calculating the ignition timing correction term COIG.

Furthermore, as depicted in FIG. 8, the higher the knock intensity KNOCK is, the greater value to which the addition term COARF2 to be added to the port injection ratio correction term CORF2 with the occurrence of knocking of the engine 3, that is, the amount of correction made to increase the port injection ratio FR2 is set (Step 21 of FIG. 4). This makes it possible to suppress knocking of the engine 3 more appropriately while suppressing unnecessary consumption of the ethanol E.

Figure 9:
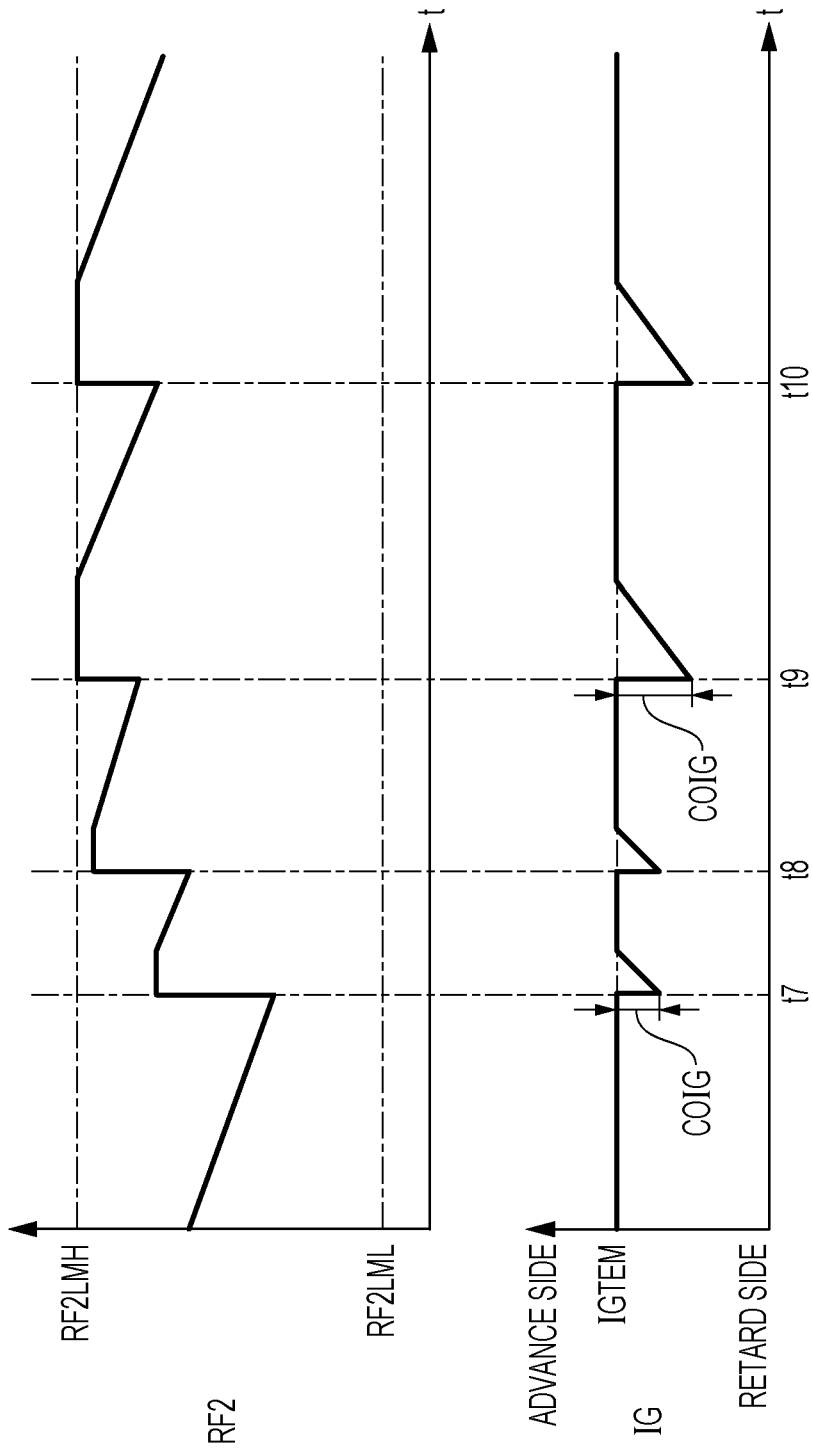
FIG. 9 is a timing diagram depicting an example of transition of the port injection ratio and the ignition timing when the port injection ratio is limited to an upper limit.

Moreover, as depicted in FIG. 9, when the port injection ratio FR2 to which a correction has been made to increase the port injection ratio FR2 is limited to the upper limit RF2LMH (time points t9 and t10, Steps 24 and 27 of FIG. 4), the ignition timing correction term COIG is increased to a larger extent (Steps 28 and 29) than when the port injection ratio FR2 to which a correction has been made to increase the port injection ratio FR2 is not limited to the upper limit RF2LMH (time points t7 and t8). This makes it possible to suppress knocking of the engine 3 more appropriately while suppressing consumption of the ethanol E.

Figure 10:
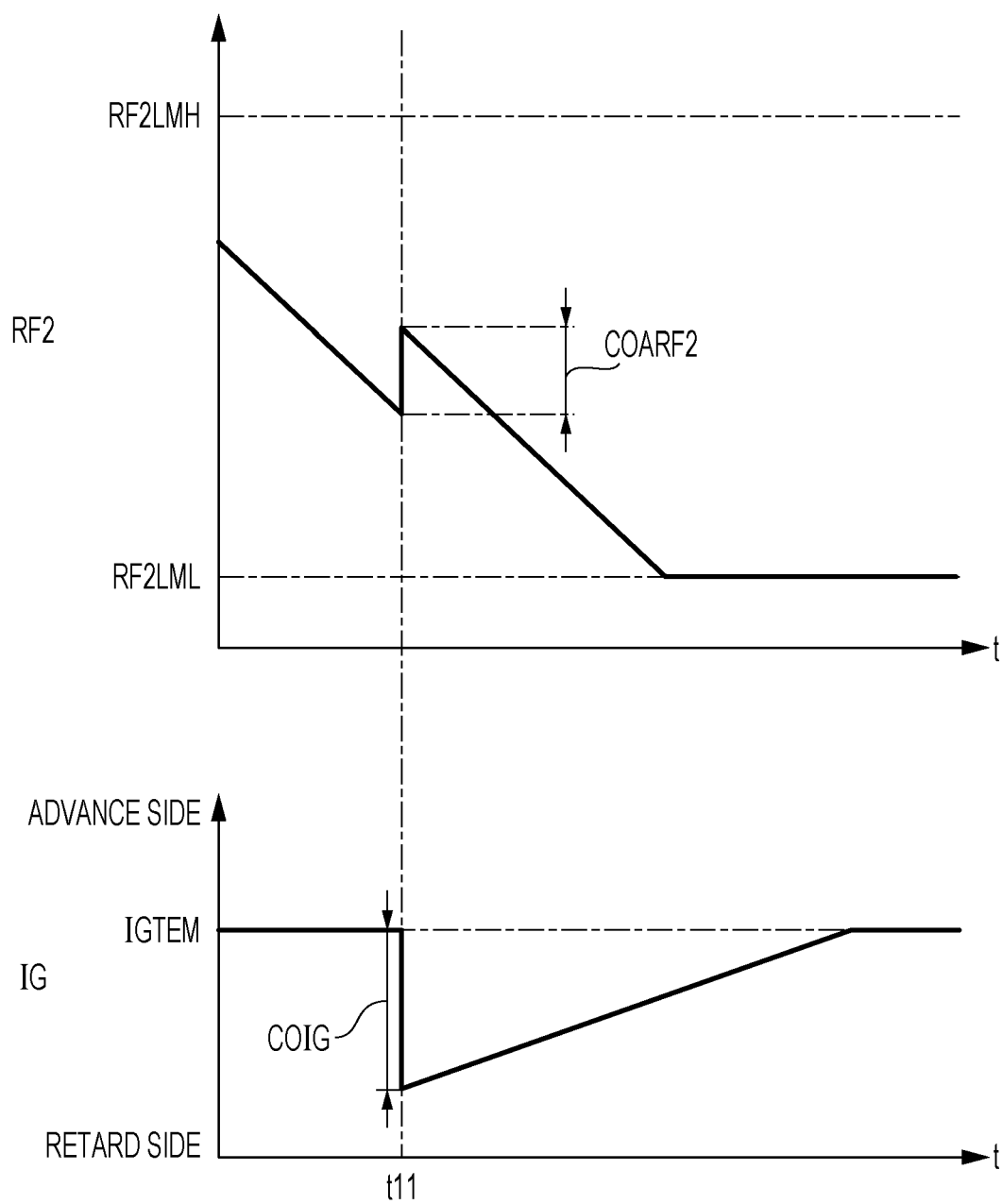
FIG. 10 is a timing diagram depicting an example of transition of the port injection ratio and the ignition timing when an ethanol level ratio is smaller than a predetermined value.
Figure 11:
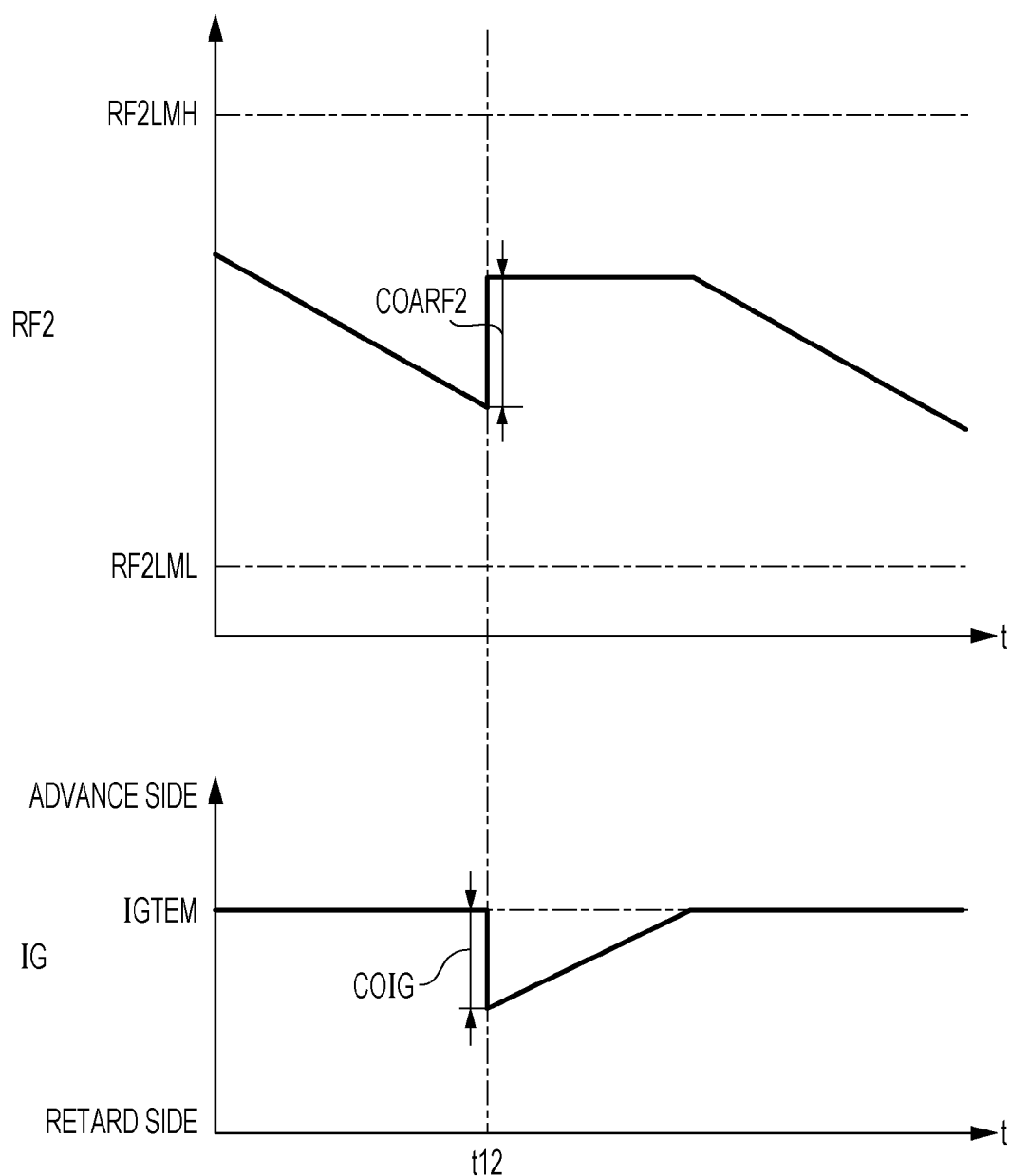
FIG. 11 is a timing diagram depicting an example of transition of the port injection ratio and the ignition timing when the ethanol level ratio is the predetermined value.
Figure 12:
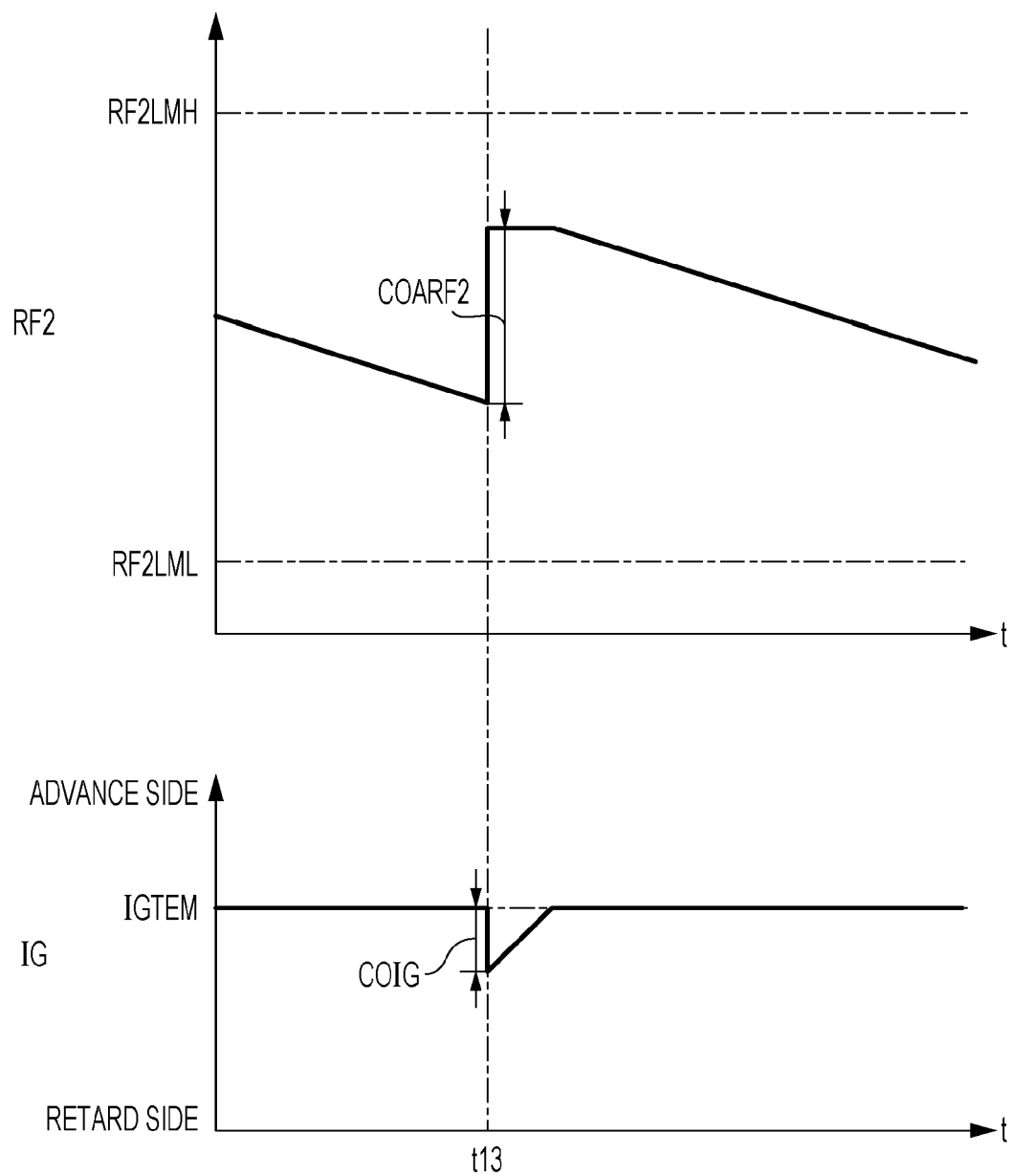
FIG. 12 is a timing diagram depicting an example of transition of the port injection ratio and the ignition timing when the ethanol level ratio is greater than the predetermined value.

In addition, FIG. 10 depicts an example of transition of the port injection ratio RF2 and the ignition timing IG when the ethanol level ratio RQRF2 is smaller than the predetermined value RQRB, FIG. 11 depicts an example of transition of the port injection ratio RF2 and the ignition timing IG when RQRF2 is equal to RQRB, and FIG. 12 depicts an example of transition of the port injection ratio RF2 and the ignition timing IG when RQRF2 is greater than RQRB. Moreover, a time point t11 of FIG. 10, a time point t12 of FIG. 11, and a time point t13 of FIG. 12 indicate the time points at which it is determined that knocking of the engine 3 has occurred.

As depicted in FIG. 10, when the ethanol level ratio RQRF2 is smaller than the predetermined value RQRB, the subtraction processing for calculating the ignition timing correction term COIG and the subtraction processing for calculating the port injection ratio correction term CORF2 are performed in parallel (Steps 59 and 61 of FIG. 6, Step 71 of FIG. 7: NO, Steps 76 to 79 of FIG. 7). Moreover, as depicted in FIGS. 10 to 12, the lower the ethanol level ratio RQRF2 is, the smaller value to which the addition term COARF2 is set (Step 21 of FIG. 4), whereby the amount of correction made to increase the port injection ratio RF2 at the occurrence of knocking of the engine 3 is set at a smaller value. Furthermore, while the subtraction processing for calculating the port injection ratio correction term CORF2 is being performed, the lower the ethanol level ratio RQRF2 is, the greater value to which the subtraction term COSRF2 is set (Steps 75 and 77 of FIG. 7), whereby, as depicted in FIGS. 10 to 12, the port injection ratio RF2 decreases more steeply. As a result, it is possible to consume the ethanol E appropriately in accordance with the ethanol level ratio RQRF2 and prevent the ethanol E from becoming too small in quantity.

Moreover, as depicted in FIGS. 10 to 12, the lower the ethanol level ratio RQRF2 is, the greater value to which the ignition timing correction term COIG is set (Steps 25 and 28 of FIG. 4), whereby the amount of correction made to retard the ignition timing IG at the occurrence of knocking of the engine 3 is set at a greater value. Furthermore, while the subtraction processing for calculating the ignition timing correction term COIG is being performed, the lower the ethanol level ratio RQRF2 is, the smaller value to which the subtraction term COSIG is set (Steps 54 and 57 of FIG. 6), whereby, as depicted in FIGS. 10 to 12, the ignition timing IG changes more gently toward the temporary ignition timing IGTEM on the advance side. As a result, it is possible to correct the ignition timing IG appropriately in such a way that the ignition timing IG is commensurate with the port injection ratio RF2 which is set in the manner described above in accordance with the ethanol level ratio RQRF2 and thereby suppress knocking of the engine 3 appropriately.

Figure 13:
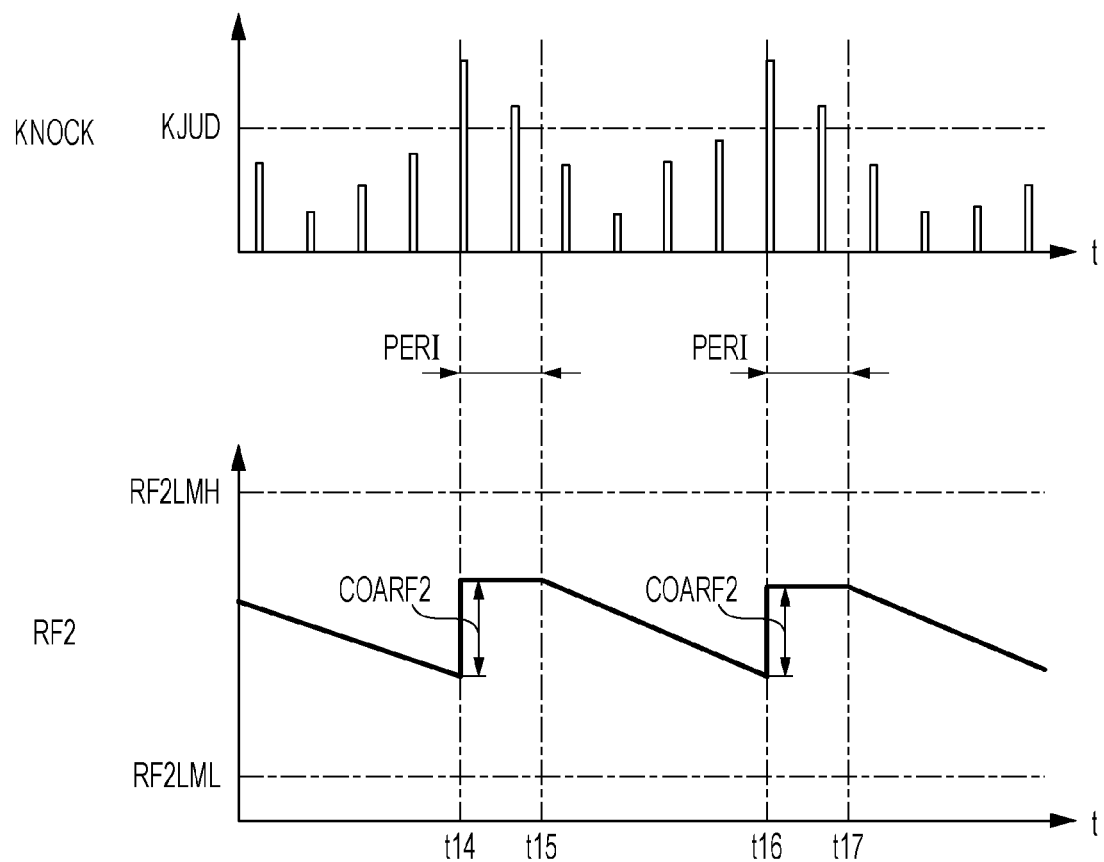
FIG. 13 is a timing diagram depicting an example of operation of a control device according to a second embodiment of the present disclosure.

Furthermore, FIG. 13 depicts an example of operation of a control device (not depicted in the drawing) according to a second embodiment of the present disclosure. This control device differs from the control device 1 according to the first embodiment only in the details of the high-octane fuel increase control in the present disclosure. Specifically, in the first embodiment, as is clear from the details of the processing in Steps 21 to 23 of FIG. 4, as long as knocking of the engine 3 is detected (as long as it is determined that knocking of the engine 3 is occurring), the port injection ratio RF2 keeps increasing as a result of addition of the addition term COARF2 being repeatedly performed, which may result in unnecessary consumption of the ethanol E.

Thus, in the second embodiment, as indicated in a period from a time point t14 to a time point t15 of FIG. 13 and a period from a time point t16 to a time point t17 of FIG. 13, until a predetermined period PERI elapses after the port injection ratio RF2 increases with the detection of knocking of the engine 3 (KNOCK>KJUD), even if knocking is detected again, addition of the addition term COARF2 is not performed again to calculate the port injection ratio RF2 and an increase in the port injection ratio RF2 is maintained. The predetermined period PERI is set so as to be the same in length as the time delay in the flow of the port injected fuel. Incidentally, the predetermined period PERI may be calculated by searching a map in accordance with a parameter correlating with the time delay in the flow of the port injected fuel, such as the engine RPM NE. The other control is performed in the same manner as described in the first embodiment.

As described above, according to the second embodiment, even when knocking of the engine 3 is detected in succession during the time delay in the flow of the port injected fuel, the port injection ratio RF2 is not further increased, which makes it possible to suppress knocking of the engine 3 while suppressing unnecessary consumption of the ethanol E. Incidentally, in the second embodiment, a correction to retard the ignition timing associated with knocking of the internal combustion engine may be omitted.

Incidentally, the present disclosure is not limited to the above-described first and second embodiments (hereinafter collectively referred to as the "embodiments") and can be carried out in various modes. For example, in the embodiments, the knock intensity KNOCK is calculated based on the cylinder pressure PCYL detected by the cylinder pressure sensor 32 and it is determined whether or not knocking of the engine 3 is occurring based on the calculated knock intensity KNOCK; however, for example, the knock intensity and knocking may be detected by a knock sensor. Moreover, in the embodiments, the knocking suppressing operation in the present disclosure is performed by making a correction to retard the ignition timing IG, but the knocking suppressing operation in the present disclosure may be performed by making a correction to reduce the amount of air which is sucked in the cylinder.

Furthermore, in the embodiments, the first and second ethanol concentrations EL1 and EL2 are detected by the first and second concentration sensors 37 and 38, respectively, but the first and second ethanol concentrations EL1 and EL2 may be estimated (calculated) in the following manner, for example. That is, when a load of the internal combustion engine is in a predetermined low-octane-number determination region, only the low-octane fuel (the gasoline G) is supplied to the internal combustion engine and, after the ignition timing is temporarily retarded from normal ignition timing (the temporary ignition timing IGTEM), the ignition timing is gradually advanced. The above-described low-octane-number determination region is set to a low load-side region of a load region (hereinafter referred to as a "knock region") in which knocking of the internal combustion engine occurs unless the ignition timing of the internal combustion engine is controlled so as to be retarded relative to the normal ignition timing or the high-octane fuel (the ethanol E) in addition to the low-octane fuel is supplied to the internal combustion engine. While the ignition timing is being advanced as described above, the presence or absence of knocking of the internal combustion engine is detected, a plurality of operation parameters which identify the operating conditions of the internal combustion engine at a time point at which knocking has occurred, such as the ignition timing, the load of the internal combustion engine, the RPM of the internal combustion engine, and the effective compression ratio, are obtained, and a map is searched based on the operation parameters thus obtained, whereby the first ethanol concentration (the octane number of the low-octane fuel) is calculated (estimated).

Moreover, the second ethanol concentration (the octane number of the high-octane fuel) is estimated in the following manner. That is, when a load of the internal combustion engine is in a predetermined high-octane-number determination region on the higher load side than the above-described low-octane-number determination region, the supplies of the low-octane fuel and the high-octane fuel are controlled in a manner similar to the processing in Steps 42 to 45 of FIG. 5 and the ignition timing is advanced from the normal ignition timing. While the ignition timing is being advanced as described above, the presence or absence of knocking of the internal combustion engine is detected, a plurality of operation parameters which identify the operating conditions of the internal combustion engine at a time point at which knocking has occurred, such as the port injection ratio RF2, the first ethanol concentration, the ignition timing, the load of the internal combustion engine, the RPM of the internal combustion engine, and the effective compression ratio, are obtained, and a map is searched based on the operation parameters thus obtained, whereby the second ethanol concentration is calculated (estimated).

Alternatively, the first and second ethanol concentrations may be estimated in the following manner, focusing on the fact that, since the gasoline G and the ethanol E have different heat values, the higher the ethanol concentration (the octane number) of a mixed fuel of G and E is, the larger the fuel injection quantity required to maintain the air fuel ratio LAF at a predetermined value becomes. That is, when a load of the internal combustion engine is in a predetermined non-knock region and is fixed, the moving average of the above-mentioned correction coefficient KINJ which is calculated based on the air fuel ratio LAF is calculated and the basic fuel injection quantity QINJB at a time point at which this moving average has been calculated is multiplied by a value obtained by subtracting the port injection ratio RF2 from 1.0, whereby a first reference injection quantity is calculated. The above-described non-knock region is set to a low load-side region in which knocking of the internal combustion engine does not occur even when only the low-octane fuel is supplied to the internal combustion engine. Then, in accordance with the calculated moving average, the calculated first reference injection quantity, and a previous value of the first ethanol concentration, a current first ethanol concentration is calculated (estimated).

Moreover, the second ethanol concentration (the octane number of the high-octane fuel) is estimated in the following manner. That is, when a load of the internal combustion engine is in the knock region and is fixed, the moving average of the above-mentioned correction coefficient KINJ which is calculated based on the air fuel ratio LAF is calculated, and the basic fuel injection quantity QINJB at a time point at which this moving average has been calculated is set as a second reference injection quantity. Then, in accordance with the calculated moving average, the calculated second reference injection quantity, and previous values of the first and second ethanol concentrations, a current second ethanol concentration is calculated (estimated).

Furthermore, in the embodiments, the gasoline G as the low-octane fuel is injected into the cylinder 3a and the ethanol E as the high-octane fuel is injected into the inlet port 4a; however, the low-octane fuel may be injected into the inlet port and the high-octane fuel may be injected into the cylinder. In addition, the embodiments deal with an example in which the present disclosure is applied to the engine 3 in which the ethanol E as the high-octane fuel is generated by separating the ethanol component from the gasoline G as the low-octane fuel, but the present disclosure is not limited thereto. The present disclosure may be applied to an internal combustion engine with separate fuel tanks, one of which is replenished with the low-octane fuel and the other of which is replenished with the high-octane fuel from the outside. Moreover, in the embodiments, the internal combustion engine according to the present disclosure is the engine 3 for a vehicle, but the internal combustion engine according to the present disclosure may be other appropriate industrial internal combustion engines such as internal combustion engines for boats and ships. In addition to those described above, the details of the configuration may be changed or modified as appropriate within the spirit of the present disclosure.

A first aspect of the present disclosure is directed to a control device 1 of an internal combustion engine in which fuel is supplied to the inside of a cylinder 3a as a result of a low-octane fuel (gasoline G in the embodiment; the same applies hereinafter) being injected into the cylinder 3a and a high-octane fuel (ethanol E) whose octane number is higher than the octane number of the low-octane fuel being injected into an inlet port 4a, the control device 1 including: a knocking detecting unit (an ECU 2, Steps 10 and 11) that detects knocking of the internal combustion engine 3; and a knocking suppressing unit (the ECU 2, Step 12 of FIG. 3, Steps 21 to 23, 25, 26, 28, 29, and 34 of FIG. 4, Steps 73 and 79 of FIG. 7) that performs, when knocking of the internal combustion engine 3 is detected (Step 11: YES), in order to suppress knocking of the internal combustion engine 3, high-octane fuel increase control by which a high-octane fuel ratio (a port injection ratio RF2) which is the ratio of the injection quantity of the high-octane fuel to the sum of the injection quantity of the low-octane fuel and the injection quantity of the high-octane fuel is increased and performs a separate knocking suppressing operation for suppressing knocking of the internal combustion engine 3 in an early stage of the high-octane fuel increase control.

With this configuration, in the internal combustion engine, the low-octane fuel and the high-octane fuel are used in combination as the fuel thereof, the low-octane fuel is injected into the cylinder of the internal combustion engine, and the high-octane fuel is injected into the inlet port of the internal combustion engine. Moreover, when knocking of the internal combustion engine is detected, the knocking suppressing unit performs the high-octane fuel increase control to suppress the knocking and performs, in an early stage of the high-octane fuel increase control, a separate knocking suppressing operation for suppressing knocking. In the high-octane fuel increase control, the high-octane fuel ratio which is the ratio of the injection quantity of the high-octane fuel to the sum of the injection quantity of the low-octane fuel and the injection quantity of the high-octane fuel is increased.

As described above, according to the present disclosure, unlike the existing control device described earlier, when knocking of the internal combustion engine is detected, an increase of the high-octane fuel ratio is performed and, in an early stage thereof, the knocking suppressing operation is also performed. As a result, it is possible to suppress knocking of the internal combustion engine appropriately during a time delay caused by the above-described delay in the flow of the high-octane fuel into the cylinder and suppress consumption of the high-octane fuel. Incidentally, "detecting" in the present disclosure and the description of eighth and ninth aspects, which will be described later, includes making a determination.

According to a second aspect of the present disclosure, in the control device 1 of the internal combustion engine described in the first aspect, the internal combustion engine 3 may include a spark plug 8 which ignites an air fuel mixture in the cylinder 3a and the knocking suppressing unit may perform, as the knocking suppressing operation, retardation correction control by which a correction to retard ignition timing IG of the spark plug 8 is made (Steps 25, 26, 28, 29, and 34 of FIG. 4).

With this configuration, as the knocking suppressing operation, the retardation correction control by which a correction to retard the ignition timing of the spark plug is made is performed. Since the ignition timing is a parameter highly responsive to the suppression of knocking of the internal combustion engine, it is possible to obtain effectively the effect by the first aspect of the present disclosure.

According to a third aspect of the present disclosure, in the control device 1 of the internal combustion engine described in the first or second aspect, after the knocking suppressing unit increases the high-octane fuel ratio by the high-octane fuel increase control, the knocking suppressing unit may perform high-octane fuel decrease control by which the high-octane fuel ratio is gradually decreased (Steps 75, 78, and 79 of FIG. 7).

With this configuration, since, after the high-octane fuel ratio is increased by the high-octane fuel increase control, the high-octane fuel decrease control by which the high-octane fuel ratio is gradually decreased is performed, it is possible to suppress unnecessary consumption of the high-octane fuel. In this case, since the high-octane fuel ratio is gradually decreased, it is possible to prevent the occurrence of knocking of the internal combustion engine caused by a sudden decrease in the octane number of the fuel in the cylinder.

According to a fourth aspect of the present disclosure, in the control device 1 of the internal combustion engine described in the third aspect, before performing the high-octane fuel decrease control, the knocking suppressing unit may perform degree-of-knocking-suppression reduction control for reducing the degree of suppression of knocking of the internal combustion engine 3 by the knocking suppressing operation (Steps 54 and 59 to 62 of FIG. 6 and Step 72 of FIG. 7).

With this configuration, since, before the high-octane fuel decrease control is performed, the degree-of-knocking-suppression reduction control by which the degree of suppression of knocking of the internal combustion engine by the knocking suppressing operation is reduced is performed, it is possible to perform the high-octane fuel increase control preferentially in order to suppress knocking of the internal combustion engine.

According to a fifth aspect of the present disclosure, in the control device 1 of the internal combustion engine described in the fourth aspect, the knocking suppressing unit may maintain, by the degree-of-knocking-suppression reduction control, the high-octane fuel ratio in a state in which the high-octane fuel ratio has been increased by the high-octane fuel increase control until the knocking suppressing operation is ended (Step 73 of FIG. 7), and, after the knocking suppressing operation is ended (Step 72: YES), the knocking suppressing unit may perform the high-octane fuel decrease control (Steps 75, 78, and 79).

With this configuration, by the degree-of-knocking-suppression reduction control, until the knocking suppressing operation is ended, the high-octane fuel ratio is maintained in a state in which the high-octane fuel ratio has been increased by the high-octane fuel increase control, and, after the knocking suppressing operation is ended, the high-octane fuel decrease control is performed. As a result, it is possible to suppress the reoccurrence of knocking of the internal combustion engine with the execution of the degree-of-knocking-suppression reduction control.

According to a sixth aspect of the present disclosure, the control device 1 of the internal combustion engine described in any one of the first to fifth aspects may further include a knock intensity detecting unit (the ECU 2, Step 10) that detects the knock intensity KNOCK of the internal combustion engine 3 and the knocking suppressing unit may set an increase (an addition term COARF2) of the high-octane fuel ratio by the high-octane fuel increase control in accordance with the detected knock intensity KNOCK (Step 21 of FIG. 4).

With this configuration, since an increase of the high-octane fuel ratio by the high-octane fuel increase control is set in accordance with the detected knock intensity (the intensity of knocking), it is possible to suppress knocking of the internal combustion engine more appropriately while suppressing unnecessary consumption of the high-octane fuel. Incidentally, "detecting" in the present disclosure includes performing calculation or estimation by a computation.

According to a seventh aspect of the present disclosure, in the control device 1 of the internal combustion engine described in any one of the first to sixth aspects may further include a limiting unit (the ECU 2, Steps 24 and 27 of FIG. 4) that limits the high-octane fuel ratio to a value smaller than or equal to a predetermined upper limit RF2LMH, and, when the high-octane fuel ratio which has been increased by the high-octane fuel increase control with detection of knocking of the internal combustion engine 3 is limited to the upper limit RF2LMH (Step 24: YES), the knocking suppressing unit may increase the degree of suppression of knocking of the internal combustion engine 3 by the knocking suppressing operation as compared to the degree of suppression observed when the high-octane fuel ratio is not limited to the upper limit RF2LMH (Steps 28 to 30).

With this configuration, the high-octane fuel ratio is limited to a value smaller than or equal to the predetermined upper limit by the limiting unit. Moreover, when the high-octane fuel ratio which has been increased by the high-octane fuel increase control associated with knocking of the internal combustion engine is limited to the upper limit, the degree of suppression of knocking of the internal combustion engine by the knocking suppressing operation is increased as compared to the degree of suppression observed when the high-octane fuel ratio is not limited to the upper limit. As a result, it is possible to suppress knocking of the internal combustion engine more appropriately while further suppressing consumption of the high-octane fuel.

An eighth aspect of the present disclosure is directed to a control device 1 of an internal combustion engine in which a low-octane fuel (gasoline G in the embodiment; the same applies hereinafter) and a high-octane fuel (ethanol E) whose octane number is higher than the octane number of the low-octane fuel are supplied to the inside of a cylinder 3a via a first fuel injection valve (a cylinder injection valve 6) and a second fuel injection valve (a port injection valve 7), respectively, and an air fuel mixture in the cylinder 3a is ignited by a spark plug 8, the control device 1 including: a knocking detecting unit (an ECU 2, Steps 10 and 11) that detects knocking of the internal combustion engine 3; and a controlling unit (the ECU 2, Step 12 of FIG. 3, Steps 21 to 23, 25, 26, 28, 29, and 34 of FIG. 4) that performs in parallel, when knocking of the internal combustion engine 3 is detected (Step 11: YES), in order to suppress knocking of the internal combustion engine 3, high-octane fuel increase control by which a high-octane fuel ratio (a port injection ratio RF2) which is the ratio of the injection quantity of the high-octane fuel to the sum of the injection quantity of the low-octane fuel by the first fuel injection valve and the injection quantity of the high-octane fuel by the second fuel injection valve is increased and retardation correction control by which a correction to retard ignition timing IG of the spark plug 8 is made.

With this configuration, in the internal combustion engine, the low-octane fuel and the high-octane fuel are used in combination as the fuel thereof, and the low-octane fuel and the high-octane fuel are supplied to the cylinder of the internal combustion engine via the first and second fuel injection valves, respectively. Moreover, when knocking of the internal combustion engine is detected, the high-octane fuel increase control and the retardation correction control are performed in parallel by the controlling unit. In the high-octane fuel increase control, the high-octane fuel ratio which is the ratio of the injection quantity of the high-octane fuel to the sum of the injection quantity of the low-octane fuel and the injection quantity of the high-octane fuel is increased. Moreover, in the retardation correction control, a correction to retard the ignition timing of the spark plug which ignites the air fuel mixture in the cylinder is made.

As described above, according to the present disclosure, unlike the existing control device described earlier, when knocking of the internal combustion engine is detected, since an increase of the high-octane fuel ratio and a correction to retard the ignition timing are performed in parallel, it is possible to suppress knocking of the internal combustion engine appropriately and suppress consumption of the high-octane fuel. Moreover, since the ignition timing is a parameter highly responsive to the suppression of knocking of the internal combustion engine, it is possible to obtain the above-described effect effectively.

A ninth aspect of the present disclosure is directed to a control device of an internal combustion engine in which fuel is supplied to the inside of a cylinder 3a as a result of a low-octane fuel being injected into the cylinder 3a and a high-octane fuel whose octane number is higher than the octane number of the low-octane fuel being injected into an inlet port 4a, the control device including: a knocking detecting unit that detects knocking of the internal combustion engine 3; and a controlling unit that performs, when knocking of the internal combustion engine 3 is detected, in order to suppress knocking of the internal combustion engine 3, high-octane fuel increase control by which a high-octane fuel ratio (a port injection ratio RF2) which is the ratio of the injection quantity of the high-octane fuel to the sum of the injection quantity of the low-octane fuel and the injection quantity of the high-octane fuel is increased, and, until a predetermined period PERI elapses after the start of the execution of the high-octane fuel increase control, the controlling unit maintains an increase (an addition term COARF2) of the high-octane fuel ratio irrespective of the presence or absence of detection of knocking of the internal combustion engine 3 (FIG. 13).

With this configuration, in the internal combustion engine, the low-octane fuel and the high-octane fuel are used in combination as the fuel thereof, the low-octane fuel is injected into the cylinder of the internal combustion engine, and the high-octane fuel is injected into the inlet port of the internal combustion engine. Moreover, when knocking of the internal combustion engine is detected, the high-octane fuel increase control is performed by the controlling unit, and, in this high-octane fuel increase control, the high-octane fuel ratio which is the ratio of the injection quantity of the high-octane fuel to the sum of the injection quantity of the low-octane fuel and the injection quantity of the high-octane fuel is increased.

Furthermore, until a predetermined period elapses after the start of the execution of the high-octane fuel increase control, irrespective of the presence or absence of detection of knocking of the internal combustion engine, an increase of the high-octane fuel ratio is maintained. As a result, even when knocking of the internal combustion engine is detected in succession during a time delay caused by the above-described delay in the flow of the high-octane fuel into the cylinder, the high-octane fuel ratio is not further increased accordingly, which makes it possible to suppress knocking of the internal combustion engine while suppressing unnecessary consumption of the high-octane fuel.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for an internal combustion engine, comprising:
   a knocking detector to detect knocking in the internal combustion engine in which a low-octane fuel is injected into a cylinder via a first fuel injection valve and a high-octane fuel whose octane number higher than an octane number of the low-octane fuel is injected into an inlet port via a second fuel injection valve; and
   a knocking suppressor comprising:
      a first knocking suppressor to increase a high-octane fuel ratio of an injection quantity of the high-octane fuel to a sum of an injection quantity of the low-octane fuel and the injection quantity of the high-octane fuel in order to suppress knocking in the internal combustion engine when the knocking detector detects the knocking; and
      a second knocking suppressor to suppress knocking of the internal combustion engine at a beginning of a period while the first knocking suppressor increases the high-octane fuel ratio, wherein
   after the first knocking suppressor increases the high-octane fuel ratio, the first knocking suppressor gradually decreases the high-octane fuel ratio, and
   before the first knocking suppressor decreases the high-octane fuel ratio, the second knocking suppressor performs degree-of-knocking-suppression reduction control for reducing a degree of suppression of knocking of the internal combustion engine.

2. The control device for the internal combustion engine according to claim 1, wherein
   the internal combustion engine includes a spark plug which ignites an air fuel mixture in the cylinder, and
   the second knocking suppressor to retard ignition timing of the spark plug.

3. The control device for the internal combustion engine according to claim 1, wherein
   the first knocking suppressor maintains the high-octane fuel ratio that is increased when the knocking detector detects the knocking until the second knocking suppressor finishes the degree-of-knocking-suppression reduction control, and, after the degree-of-knocking-suppression reduction control is finished, the first knocking suppressor decreases the high-octane fuel ratio.

4. The control device for the internal combustion engine according to claim 1, further comprising:
   a knock intensity detector to detect a knock intensity of the internal combustion engine, and
   the first knocking suppressor to set an increase of the high-octane fuel ratio in accordance with the detected knock intensity.

5. The control device for the internal combustion engine according to claim 1, further comprising:
   a limiter to limit the high-octane fuel ratio to a predetermined upper limit, wherein
   when the limiter sets the high-octane fuel ratio to the upper limit, the second knocking suppressor increases a degree of suppression of knocking of the internal combustion engine as compared to a degree of suppression observed when the high-octane fuel ratio does not reach the upper limit.

6. A control device for an internal combustion engine, comprising:
   a knocking detector to detect knocking in the internal combustion engine in which a low-octane fuel and a high-octane fuel whose octane number is higher than an octane number of the low-octane fuel are supplied into a cylinder via a first fuel injection valve and a second fuel injection valve, respectively, and an air fuel mixture in the cylinder is ignited by a spark plug; and
   a knocking suppressor comprising:
      a first knocking suppressor to increase a high-octane fuel ratio of an injection quantity of the high-octane fuel to a sum of an injection quantity of the low-octane fuel and the injection quantity of the high-octane fuel in order to suppress knocking in the internal combustion engine when the knocking detector detects the knocking; and
      a second knocking suppressor to retard ignition timing of the spark plug, wherein
   after the first knocking suppressor increases the high-octane fuel ratio, the first knocking suppressor gradually decreases the high-octane fuel ratio, and
   before the first knocking suppressor decreases the high-octane fuel ratio, the second knocking suppressor performs degree-of-knocking-suppression reduction control for reducing a degree of suppression of knocking of the internal combustion engine.

* * * * *